United States Patent
Boettcher et al.

(10) Patent No.: US 9,778,639 B2
(45) Date of Patent: Oct. 3, 2017

(54) SYSTEMS AND METHODS FOR ADAPTIVELY UPDATING EQUIPMENT MODELS

(71) Applicant: Johnson Controls Technology Company, Holland, MI (US)

(72) Inventors: Andrew J. Boettcher, Wauwatosa, WI (US); Steven R. Vitullo, Milwaukee, WI (US); Kirk H. Drees, Cedarburg, WI (US); Michael J. Wenzel, Grafton, WI (US)

(73) Assignee: Johnson Controls Technology Company, Milwaukee, WI (US)

( * ) Notice: Subject to any disclaimer, the term of this patent is extended or adjusted under 35 U.S.C. 154(b) by 354 days.

(21) Appl. No.: 14/579,736

(22) Filed: Dec. 22, 2014

(65) Prior Publication Data

US 2016/0180220 A1    Jun. 23, 2016

(51) Int. Cl.
G05B 19/042    (2006.01)
G05B 23/02    (2006.01)

(52) U.S. Cl.
CPC ......... *G05B 19/042* (2013.01); *G05B 23/024* (2013.01); *G05B 2219/2642* (2013.01)

(58) Field of Classification Search
CPC .... F24F 11/006; F24F 11/0079; F24F 5/0017; F24F 5/0035; G05B 19/042; G05B 23/024

(Continued)

(56) References Cited

U.S. PATENT DOCUMENTS 2,812,141 A    11/1957    Sueda et al.
3,181,791 A    5/1965    Axelrod
(Continued)

FOREIGN PATENT DOCUMENTS

JP    63-231127 A    9/1988
JP    04-062352 A    2/1992
(Continued)

OTHER PUBLICATIONS

U.S. Appl. No. 14/133,310, filed Dec. 18, 2013, Johnson Controls Technology Company.

(Continued)

*Primary Examiner* — Vincent Tran
(74) *Attorney, Agent, or Firm* — Foley & Lardner LLP

(57) ABSTRACT

An operating data aggregator module collects a first set of operating data and a second set of operating data for building equipment. A model generator module generates a first set of model coefficients and a second set of model coefficients for a predictive model for the building equipment using the first set of operating data and the second set of operating data, respectively. A test statistic module generates a test statistic based on a difference between the first set of model coefficients and the second set of model coefficients. A critical value module calculates critical value for the test statistic. A hypothesis testing module compares the test statistic with the critical value using a statistical hypothesis test to determine whether the predictive model has changed. In response to a determination that the predictive model has changed, a fault indication may be generated and/or the predictive model may be adaptively updated.

16 Claims, 7 Drawing Sheets

"

(58) Field of Classification Search
USPC .......................................................... 700/276
See application file for complete search history.

(56) References Cited

U.S. PATENT DOCUMENTS

| | | |
|---|---|---|
| 3,641,326 A | 2/1972 | Harte |
| 3,998,093 A | 12/1976 | Bertolasi |
| 4,114,807 A | 9/1978 | Naseck et al. |
| 4,182,180 A | 1/1980 | Mott |
| 4,199,101 A | 4/1980 | Bramow et al. |
| 4,211,089 A | 7/1980 | Mueller et al. |
| 4,213,174 A | 7/1980 | Morley et al. |
| 4,257,238 A | 3/1981 | Kountz et al. |
| 4,319,461 A | 3/1982 | Shaw |
| 4,325,223 A | 4/1982 | Cantley |
| 4,346,446 A | 8/1982 | Erbstein et al. |
| 4,432,031 A | 2/1984 | Premerlani |
| 4,512,161 A | 4/1985 | Logan et al. |
| 4,557,317 A | 12/1985 | Harmon, Jr. |
| 4,558,595 A | 12/1985 | Kompelien |
| 4,607,789 A | 8/1986 | Bowman |
| 4,611,470 A | 9/1986 | Enstrom |
| 4,622,922 A | 11/1986 | Miyagaki et al. |
| 4,749,122 A | 6/1988 | Shriver et al. |
| 4,776,301 A | 10/1988 | Dziubakowski |
| 4,802,100 A | 1/1989 | Aasen et al. |
| 4,855,922 A | 8/1989 | Huddleston et al. |
| 4,866,635 A | 9/1989 | Kahn et al. |
| 4,876,858 A | 10/1989 | Shaw et al. |
| 4,897,798 A | 1/1990 | Cler |
| 4,916,909 A | 4/1990 | Mathur et al. |
| 4,942,740 A | 7/1990 | Shaw et al. |
| 4,964,126 A | 10/1990 | Musicus et al. |
| 5,074,137 A | 12/1991 | Harris et al. |
| 5,090,303 A | 2/1992 | Ahmed |
| 5,099,436 A | 3/1992 | McCown et al. |
| 5,103,391 A | 4/1992 | Barrett |
| 5,115,967 A | 5/1992 | Wedekind |
| 5,131,746 A | 7/1992 | O'Rourke et al. |
| 5,189,606 A | 2/1993 | Burns et al. |
| 5,218,525 A | 6/1993 | Amasaki et al. |
| 5,251,814 A | 10/1993 | Warashina et al. |
| 5,253,159 A | 10/1993 | Bilas et al. |
| 5,274,571 A | 12/1993 | Hesse et al. |
| 5,299,312 A | 3/1994 | Rocco, Jr. |
| 5,315,502 A | 5/1994 | Koyama et al. |
| 5,346,129 A | 9/1994 | Shah et al. |
| 5,351,855 A | 10/1994 | Nelson et al. |
| 5,355,305 A | 10/1994 | Seem et al. |
| 5,414,640 A | 5/1995 | Seem |
| 5,426,421 A | 6/1995 | Gray |
| 5,461,877 A | 10/1995 | Shaw et al. |
| 5,467,287 A | 11/1995 | Wenner et al. |
| 5,481,481 A | 1/1996 | Frey et al. |
| 5,506,768 A | 4/1996 | Seem et al. |
| 5,528,516 A | 6/1996 | Yemini et al. |
| 5,552,763 A | 9/1996 | Kirby |
| 5,555,195 A | 9/1996 | Jensen et al. |
| 5,557,546 A | 9/1996 | Fukai et al. |
| 5,566,084 A | 10/1996 | Cmar |
| 5,566,092 A | 10/1996 | Wang et al. |
| 5,568,377 A | 10/1996 | Seem et al. |
| 5,572,878 A | 11/1996 | Kapoor |
| 5,582,021 A | 12/1996 | Masauji |
| 5,590,830 A | 1/1997 | Kettler et al. |
| 5,592,147 A | 1/1997 | Wong |
| 5,596,507 A | 1/1997 | Jones et al. |
| 5,602,761 A | 2/1997 | Spoerre et al. |
| 5,663,963 A | 9/1997 | Goodwin, III |
| 5,675,979 A | 10/1997 | Shah |
| 5,682,329 A | 10/1997 | Seem et al. |
| 5,751,916 A | 5/1998 | Kon et al. |
| 5,769,315 A | 6/1998 | Drees |
| 5,791,408 A | 8/1998 | Seem |
| 5,838,561 A | 11/1998 | Owen |
| 5,867,384 A | 2/1999 | Drees et al. |
| 5,911,127 A | 6/1999 | Tulpule |
| 5,918,200 A | 6/1999 | Tsutsui et al. |
| 5,924,486 A | 7/1999 | Ehlers et al. |
| 5,930,773 A | 7/1999 | Crooks et al. |
| 5,960,381 A | 9/1999 | Singers et al. |
| 5,963,458 A | 10/1999 | Cascia |
| 6,005,577 A | 12/1999 | Breitlow |
| 6,006,142 A | 12/1999 | Seem et al. |
| 6,012,152 A | 1/2000 | Douik et al. |
| 6,021,401 A | 2/2000 | Oravetz et al. |
| 6,029,092 A | 2/2000 | Stein |
| 6,058,161 A | 5/2000 | Anderson et al. |
| 6,067,083 A | 5/2000 | Glen et al. |
| 6,104,963 A | 8/2000 | Cebasek et al. |
| 6,122,603 A | 9/2000 | Budike, Jr. |
| 6,122,605 A | 9/2000 | Drees et al. |
| 6,141,595 A | 10/2000 | Gloudeman et al. |
| 6,148,306 A | 11/2000 | Seidl et al. |
| 6,157,943 A | 12/2000 | Meyer |
| 6,161,764 A | 12/2000 | Jatnieks |
| 6,178,362 B1 | 1/2001 | Woolard et al. |
| 6,185,483 B1 | 2/2001 | Drees |
| 6,216,956 B1 | 4/2001 | Ehlers et al. |
| 6,219,590 B1 | 4/2001 | Bernaden, III et al. |
| 6,223,544 B1 | 5/2001 | Seem |
| 6,253,121 B1 | 6/2001 | Cline et al. |
| 6,265,843 B1 | 7/2001 | West et al. |
| 6,269,650 B1 | 8/2001 | Shaw |
| 6,282,910 B1 | 9/2001 | Helt |
| 6,296,193 B1 | 10/2001 | West et al. |
| 6,324,659 B1 | 11/2001 | Pierro |
| 6,366,832 B2 | 4/2002 | Lomonaco et al. |
| 6,366,889 B1 | 4/2002 | Zaloom |
| 6,369,716 B1 | 4/2002 | Abbas et al. |
| 6,389,331 B1 | 5/2002 | Jensen et al. |
| 6,408,228 B1 | 6/2002 | Seem et al. |
| 6,415,276 B1 | 7/2002 | Heger et al. |
| 6,415,617 B1 | 7/2002 | Seem |
| 6,456,622 B1 | 9/2002 | Skaanning et al. |
| 6,477,439 B1 | 11/2002 | Bernaden, III et al. |
| 6,535,865 B1 | 3/2003 | Skaaning et al. |
| 6,556,950 B1 | 4/2003 | Schwenke et al. |
| 6,577,962 B1 | 6/2003 | Afshari |
| 6,594,554 B1 | 7/2003 | Seem et al. |
| 6,622,264 B1 | 9/2003 | Bliley et al. |
| 6,626,366 B2 | 9/2003 | Kayahara et al. |
| 6,631,299 B1 | 10/2003 | Patel et al. |
| 6,633,782 B1 | 10/2003 | Schleiss et al. |
| 6,651,034 B1 | 11/2003 | Hedlund et al. |
| 6,676,831 B2 | 1/2004 | Wolfe |
| 6,684,208 B2 | 1/2004 | Kil et al. |
| 6,687,685 B1 | 2/2004 | Sadeghi et al. |
| 6,757,668 B1 | 6/2004 | Goebel et al. |
| 6,785,592 B1 | 8/2004 | Smith et al. |
| 6,816,811 B2 | 11/2004 | Seem |
| 6,834,208 B2 | 12/2004 | Gonzales et al. |
| 6,853,882 B2 | 2/2005 | Dudley |
| 6,862,499 B1 | 3/2005 | Cretella et al. |
| 6,862,540 B1 | 3/2005 | Welch et al. |
| 6,865,449 B2 | 3/2005 | Dudley |
| 6,891,536 B2 | 5/2005 | Smith |
| 6,937,909 B2 | 8/2005 | Seem |
| 6,944,524 B2 | 9/2005 | Shier et al. |
| 6,968,295 B1 | 11/2005 | Carr |
| 6,973,793 B2 | 12/2005 | Douglas et al. |
| 6,996,508 B1 | 2/2006 | Culp et al. |
| 7,031,880 B1 | 4/2006 | Seem et al. |
| 7,036,559 B2 | 5/2006 | Stanimirovic |
| 7,043,661 B2 | 5/2006 | Valadarsky et al. |
| 7,096,387 B2 | 8/2006 | Durrant et al. |
| 7,110,919 B2 | 9/2006 | Brindac et al. |
| 7,113,890 B2 | 9/2006 | Frerichs et al. |
| 7,113,988 B2 | 9/2006 | Chirashnya et al. |
| 7,124,637 B2 | 10/2006 | Singhal et al. |
| 7,181,648 B2 | 2/2007 | Bjorsne et al. |
| 7,212,887 B2 | 5/2007 | Shah et al |
| 7,216,021 B2 | 5/2007 | Matsubara et al. |
| 7,218,974 B2 | 5/2007 | Rumi et al. |

(56) References Cited

U.S. PATENT DOCUMENTS

| | | |
|---|---|---|
| 7,222,800 B2 | 5/2007 | Wruck |
| 7,225,089 B2 | 5/2007 | Culp et al. |
| 7,231,281 B2 | 6/2007 | Costa |
| 7,246,039 B2 | 7/2007 | Moorhouse |
| 7,251,582 B2 | 7/2007 | Singh et al. |
| 7,257,744 B2 | 8/2007 | Sabet et al. |
| 7,284,372 B2 | 10/2007 | Crow |
| 7,356,548 B1 | 4/2008 | Culp et al. |
| 7,409,303 B2 | 8/2008 | Yeo et al. |
| 7,434,413 B2 | 10/2008 | Wruck |
| 7,444,251 B2 | 10/2008 | Nikovski et al. |
| 7,451,003 B2 | 11/2008 | Chester et al. |
| 7,451,017 B2 | 11/2008 | McNally |
| 7,519,485 B2 | 4/2009 | MacGregor |
| 7,552,033 B1 | 6/2009 | Culp et al. |
| 7,567,844 B2 | 7/2009 | Thomas et al. |
| 7,567,888 B2 | 7/2009 | Chang et al. |
| 7,577,550 B2 | 8/2009 | Ozonat et al. |
| 7,578,734 B2 | 8/2009 | Ahmed et al. |
| 7,636,613 B2 | 12/2009 | Borah et al. |
| 7,685,830 B2 | 3/2010 | Thybo et al. |
| 7,698,233 B1 | 4/2010 | Edwards et al. |
| 7,705,269 B2 | 4/2010 | Daniel |
| 7,822,709 B2 | 10/2010 | Godwin |
| 7,827,813 B2 | 11/2010 | Seem |
| 7,844,366 B2 | 11/2010 | Singh |
| 7,873,442 B2 | 1/2011 | Tsui |
| 7,873,485 B2 | 1/2011 | Castelli et al. |
| 7,880,602 B2 | 2/2011 | Kasamatsu |
| 7,881,889 B2 | 2/2011 | Barclay et al. |
| 7,908,126 B2 | 3/2011 | Bahel et al. |
| 7,918,407 B2 | 4/2011 | Patch |
| 7,962,536 B2 | 6/2011 | Culp et al. |
| 7,965,178 B1 | 6/2011 | Schmuttor et al. |
| 8,027,742 B2 | 9/2011 | Seem et al. |
| 8,103,465 B2 | 1/2012 | Brzezowski et al. |
| 8,172,154 B1 | 5/2012 | Figley et al. |
| 8,200,344 B2 | 6/2012 | Li et al. |
| 8,200,345 B2 | 6/2012 | Li et al. |
| 8,200,449 B2 | 6/2012 | Mark |
| 8,200,456 B2 | 6/2012 | Marik et al. |
| 8,219,250 B2 | 7/2012 | Dempster et al. |
| 8,239,168 B2 | 8/2012 | House et al. |
| 8,417,392 B2 | 4/2013 | Higgins |
| 8,532,808 B2 | 9/2013 | Drees et al. |
| 8,731,724 B2 | 5/2014 | Drees et al. |
| 2001/0045960 A1 | 11/2001 | Keeley |
| 2002/0010563 A1 | 1/2002 | Ratteree et al. |
| 2002/0016639 A1 | 2/2002 | Smith et al. |
| 2002/0030114 A1 | 3/2002 | Kayahara et al. |
| 2002/0038169 A1 | 3/2002 | Cline et al. |
| 2002/0045995 A1 | 4/2002 | Shimazaki et al. |
| 2002/0055820 A1 | 5/2002 | Scannell |
| 2002/0138782 A1 | 9/2002 | Durrant et al. |
| 2002/0152298 A1 | 10/2002 | Kikta et al. |
| 2002/0183988 A1 | 12/2002 | Skaanning et al. |
| 2003/0014160 A1 | 1/2003 | Nordquist et al. |
| 2003/0028350 A1 | 2/2003 | Seem |
| 2003/0031164 A1 | 2/2003 | Nabkel et al. |
| 2003/0074304 A1 | 4/2003 | Okada |
| 2003/0079483 A1 | 5/2003 | Komatsu et al. |
| 2003/0090371 A1 | 5/2003 | Teowee et al. |
| 2003/0093186 A1 | 5/2003 | Patterson et al. |
| 2003/0105556 A1 | 6/2003 | Enis et al. |
| 2003/0114942 A1 | 6/2003 | Varone et al. |
| 2003/0135339 A1 | 7/2003 | Gristina et al. |
| 2003/0172087 A1 | 9/2003 | Godwin |
| 2003/0177705 A1 | 9/2003 | Forbis et al. |
| 2003/0229572 A1 | 12/2003 | Raines et al. |
| 2004/0002776 A1 | 1/2004 | Bickford |
| 2004/0010733 A1 | 1/2004 | S. et al. |
| 2004/0024494 A1 | 2/2004 | Bayoumi et al. |
| 2004/0072535 A1 | 4/2004 | Schneider et al. |
| 2004/0102924 A1 | 5/2004 | Jarrell et al. |
| 2004/0102937 A1 | 5/2004 | Ibrahim |
| 2004/0143510 A1 | 7/2004 | Haeberle et al. |
| 2004/0143810 A1 | 7/2004 | Ahmed et al. |
| 2004/0153819 A1 | 8/2004 | Bjorsne et al. |
| 2004/0158417 A1 | 8/2004 | Bonet |
| 2004/0164690 A1 | 8/2004 | Degner et al. |
| 2004/0186630 A1 | 9/2004 | Shier et al. |
| 2004/0267395 A1 | 12/2004 | Discenzo et al. |
| 2005/0006488 A1 | 1/2005 | Stanimirovic |
| 2005/0033458 A1 | 2/2005 | Brindac et al. |
| 2005/0033481 A1 | 2/2005 | Budhraja et al. |
| 2005/0040250 A1 | 2/2005 | Wruck |
| 2005/0114311 A1 | 5/2005 | Cheng et al. |
| 2005/0159847 A1 | 7/2005 | Shah et al. |
| 2005/0160324 A1 | 7/2005 | Przytula et al. |
| 2005/0192680 A1 | 9/2005 | Cascia et al. |
| 2005/0256661 A1 | 11/2005 | Salsbury et al. |
| 2005/0278047 A1 | 12/2005 | Ahmed |
| 2006/0015195 A1 | 1/2006 | Lehman et al. |
| 2006/0058900 A1 | 3/2006 | Johanson et al. |
| 2006/0058923 A1 | 3/2006 | Kruk et al. |
| 2006/0090467 A1 | 5/2006 | Crow |
| 2006/0106739 A1 | 5/2006 | Holzbauer et al. |
| 2006/0125422 A1 | 6/2006 | Costa |
| 2006/0144057 A1 | 7/2006 | You et al. |
| 2006/0167591 A1 | 7/2006 | McNally |
| 2006/0171396 A1 | 8/2006 | Singh et al. |
| 2006/0173256 A1 | 8/2006 | Ridder et al. |
| 2006/0206240 A1 | 9/2006 | Tsui |
| 2006/0224254 A1 | 10/2006 | Rumi et al. |
| 2006/0259285 A1 | 11/2006 | Bahel et al. |
| 2007/0005311 A1* | 1/2007 | Wegerich ........... G05B 23/0254 703/2 |
| 2007/0006124 A1 | 1/2007 | Ahmed et al. |
| 2007/0023533 A1 | 2/2007 | Liu |
| 2007/0061046 A1 | 3/2007 | Mairs et al. |
| 2007/0067062 A1 | 3/2007 | Mairs et al. |
| 2007/0139183 A1 | 6/2007 | Kates |
| 2007/0143045 A1 | 6/2007 | MacGregor |
| 2008/0033674 A1 | 2/2008 | Nikovski et al. |
| 2008/0082183 A1 | 4/2008 | Judge |
| 2008/0097651 A1 | 4/2008 | Shah et al. |
| 2008/0147465 A1 | 6/2008 | Raines et al. |
| 2008/0171396 A1 | 7/2008 | Fung et al. |
| 2008/0172258 A1 | 7/2008 | Weger et al. |
| 2008/0179408 A1 | 7/2008 | Seem |
| 2008/0183424 A1 | 7/2008 | Seem |
| 2008/0231437 A1 | 9/2008 | Singhal et al. |
| 2008/0275674 A1 | 11/2008 | Reghetti et al. |
| 2008/0277486 A1 | 11/2008 | Seem et al. |
| 2008/0300963 A1 | 12/2008 | Seetharaman et al. |
| 2009/0012654 A1 | 1/2009 | Culp et al. |
| 2009/0076790 A1 | 3/2009 | Fein et al. |
| 2009/0078401 A1 | 3/2009 | Cichanowicz |
| 2009/0083583 A1 | 3/2009 | Seem et al. |
| 2009/0099889 A1 | 4/2009 | Okamoto et al. |
| 2009/0106178 A1 | 4/2009 | Chu |
| 2009/0112522 A1 | 4/2009 | Rasmussen |
| 2009/0132096 A1 | 5/2009 | Swarztrauber et al. |
| 2009/0138203 A1 | 5/2009 | Iossifov et al. |
| 2009/0204267 A1 | 8/2009 | Sustaeta et al. |
| 2009/0216469 A1 | 8/2009 | Marik et al. |
| 2009/0308941 A1 | 12/2009 | Patch |
| 2009/0327890 A1 | 12/2009 | Mertz et al. |
| 2010/0004882 A1 | 1/2010 | Chu et al. |
| 2010/0042453 A1 | 2/2010 | Scaramellino et al. |
| 2010/0049676 A1 | 2/2010 | Devitt et al. |
| 2010/0070907 A1 | 3/2010 | Harrod et al. |
| 2010/0082161 A1 | 4/2010 | Patch |
| 2010/0106328 A1 | 4/2010 | Li et al. |
| 2010/0106331 A1 | 4/2010 | Li et al. |
| 2010/0114385 A1 | 5/2010 | Dempster et al. |
| 2010/0207951 A1 | 8/2010 | Plaisted et al. |
| 2010/0211222 A1 | 8/2010 | Ghosn |
| 2010/0257108 A1 | 10/2010 | Skeels et al. |
| 2010/0274366 A1 | 10/2010 | Fata et al. |
| 2010/0280774 A1 | 11/2010 | Ewing et al. |
| 2010/0283606 A1 | 11/2010 | Tsypin et al. |
| 2010/0286937 A1 | 11/2010 | Hedley et al. |
| 2010/0324741 A1 | 12/2010 | House et al. |

(56) References Cited

U.S. PATENT DOCUMENTS

| | | | |
|---|---|---|---|
| 2010/0324962 | A1 | 12/2010 | Nesler et al. |
| 2011/0029422 | A1 | 2/2011 | Rey |
| 2011/0061015 | A1 | 3/2011 | Drees et al. |
| 2011/0130886 | A1 | 6/2011 | Drees et al. |
| 2011/0178977 | A1 | 7/2011 | Drees |
| 2011/0194003 | A1* | 8/2011 | Saito ............... H04N 5/378 348/294 |
| 2011/0204720 | A1 | 8/2011 | Ruiz et al. |
| 2011/0246381 | A1 | 10/2011 | Fitch et al. |
| 2011/0257911 | A1* | 10/2011 | Drees ............... G05B 15/02 702/61 |
| 2011/0320045 | A1 | 12/2011 | Salsbury et al. |
| 2012/0072039 | A1 | 3/2012 | Anderson et al. |
| 2012/0084063 | A1 | 4/2012 | Drees et al. |
| 2012/0259583 | A1 | 10/2012 | Noboa et al. |
| 2012/0278038 | A1 | 11/2012 | An et al. |
| 2013/0085614 | A1 | 4/2013 | Wenzel et al. |
| 2013/0086010 | A1 | 4/2013 | Wenzel et al. |
| 2013/0151179 | A1* | 6/2013 | Gray ............... H02J 13/0096 702/62 |
| 2013/0325377 | A1* | 12/2013 | Drees ............... G06Q 10/06 702/61 |
| 2014/0245071 | A1* | 8/2014 | Drees ............... G06F 11/079 714/39 |
| 2014/0278332 | A1* | 9/2014 | Grammatikakis ...... H02S 50/00 703/18 |

FOREIGN PATENT DOCUMENTS

| | | |
|---|---|---|
| JP | 10-047738 A | 2/1998 |
| JP | 06-079426 A | 3/2006 |
| JP | 2006-079426 A | 3/2006 |
| SU | 535103 | 11/1976 |
| WO | WO-00/68744 A1 | 11/2000 |
| WO | WO-2009/012269 A2 | 1/2009 |
| WO | WO-2009/012282 A2 | 1/2009 |
| WO | WO-2011/100255 A3 | 8/2011 |

OTHER PUBLICATIONS

Andersen, Stochastic Modeling of Energy Systems, Technical University of Denmark, Department of Informatics and Mathematical Modeling, 2001, 212 pages.

ANSI/ASHRAE/IESNA 90.1 User's Manual, Energy Standard for Buildings Except Low-Rise Residential Buildings, 2004, 7 pages.

Ashrae Guideline 14-2002, Measurement of Energy and Demand Savings, 2002, 170 pages.

Ashrae Standard 90.1-2004, Energy Standard for Buildings Except Low-Rise Residential Buildings, 2004, 4 pages.

Barnett et al., Outliers in Statistical Data, 1994, 14 pages.

Cowan, Review of Recent Commercial Roof Top Unit Field Studies in the Pacific Northwest and California, Oct. 8, 2004, 18 pages.

DOE Federal Emergency Management Program, Actions You Can Take to Reduce Cooling Costs, http://www1.eere.energy.gov/femp/pdfs/om_cooling.pdf, May 2005, 8 pages.

Edelson, Building Automation Security in Office Building, Elsevier, 2004, 3 pages.

Financial Times Energy, Inc. Economizers, Energy Design Resources, taken from http://www.energydesignresources.com/resource/28/, Jan. 2007, 32 pages.

Geweke, Efficient Simulation from the Multivariate Normal and Student-T Distributions Subject to Linear Constraints and the Evaluation of Constraint Probabilities, Computing Science and Statistics, Seattle, Apr. 22-24, 1991, 14 pages.

House et al., An Expert Rule Set for Fault Detection in Air-Handling Units, ASHRAE Transactions, 2001, 32 pages.

Iglewicz et al., vol. 16: How to Detect and Handle Outliers, The ASQC Basic References in Quality Control: Statistical Techniques, 1993, 15 pages.

International Performance Measurement & Verification Protocol, Concepts and Options for Determining Energy and Water Savings, Mar. 2002, 93 pages.

Jaehn, The Zone Control Chart, Quality Progress, Jul. 1991, 6 pages.

Kastner et al., Communication Systems for Building Automation and Control, 2005, 26 pages.

Katipamula et al., Methods for Fault Detection, Diagnostics, and Prognostics for Building Systems-A Review, Part I, American Society of Heating, 2005, 24 pages.

Katipamula et al., Methods of Fault Detection, Diagnostics, and Prognostics for Building Systems-A Review, Part II, American Society of Heating, Refrigerating and Air Conditioning Engineers, 2005, 19 pages.

Kim et al., Performance Enhancement of Cyclostationarity Detector by Utilizing Multiple Cyclic Frequencies of OFDM Signals, IEEE DySPAN, 2010, 8 pages.

Leblanc, Sur l'electrification des Chemins de fer au Moyen de Courants Alternatifs de Frequence Elevee, Revue Generale de l'Electricite, 1922, 4 pages.

Leyva et al., MPPT of Photovoltaic Systems using Extremum-Seeking Control, IEEE Transactions on Aerospace and Electronic Systems, Jan. 2006, 10 pages.

Li et al., Extremum Seeking Control of a Tunable Thermoacoustic Cooler, IEEE Transactions on Control Systems Technology, Jul. 2005, 10 pages.

Martin et al., Supervisory Control for Energy Savings and Thermal Comfort in Commercial Building HVAC Systems, AAAI Technical Report, 2002, 8 pages.

Mathews et al., A Tool for Integrated HVAC, Building, Energy, and Control Analysis Part 1: Overview of QUICK Control, 1999, 21 pages.

Nelson, Best Target Value for a Production Process, Journal of Quality Technology, Apr. 1978, 4 pages.

Quesenberry, SPC Methods of Quality Improvement, 1997, 49 pages.

Rosner, Percentage Points for a Generalized ESD Many-Outlier Procedure, Technometrics, May 1983, 10 pages.

Salsbury, A Controller for HVAC Systems with Embedded Fault Detection Capabilities Based on Simulation Models, Sep. 1999, 8 pages.

Sane et al., Building HVAC Control Systems—Role of Controls and Optimization, Jun. 2006, 6 pages.

Shakeri et al., "Optimal and Near-Optimal Algorithms for Multiple Fault Diagnosis with Unreliable Tests", IEEE, 1996, pp. 473-482.

Shengwei et al., Parameter Estimation of Internal Thermal Mass of Building Dynamic Models Using Genetic Algorithm:, Elsevier, vol. 47, Issues 13, Aug. 14, 2006, pp. 1927-1941.

Sreedharan et al., Comparison of Chiller Models for Use in Model-Based Fault Detection, eScholarship, 2001, 12 pages.

Teel, Lyapunov Methods in Nonsmooth Optimization, Part I: Quasi-Newton Algorithms for Lipschitz, Regular Functions, Dec. 2000, 8 pages.

Teel, Lyapunov Methods in Nonsmooth Optimization, Part II: Persistently Exciting Finite Differences, Dec. 2000, 8 pages.

Titica et al., Adaptive Extremum Seeking Control of Fed-Batch Bioreactors, European Journal of Control, 2003, 14 pages.

Tudoroiu et al., "Fault Detection and Diagnostic of Valve Actuators in HVAC System", IEEE, 2005, pp. 1281-1286.

U.S. Department of Energy, M&V Guidelines: Measurement and Verification for Federal Energy Projects, Apr. 2008, 306 pages.

Uraikul et al., Artificial Intelligence for Monitoring and Supervisory Control of Process Systems, 2006, 17 pages.

Wong et al., Building Automation in the 21st Century, IEEE, 1997, 6 pages.

Xu et al., "A Simplified Dynamic Model for Existing Buildings Using CTF and Thermal Network Models", Elsevier, vol. 47, Issue 9, Sep. 2008, pp. 1249-1262.

* cited by examiner

SYSTEMS AND METHODS FOR ADAPTIVELY UPDATING EQUIPMENT MODELS

BACKGROUND

The present description relates generally to equipment models used to predict the performance of building equipment. The present description relates more particularly to systems and methods for determining when an equipment model no longer accurately represents the corresponding building equipment.

Equipment models are used to predict performance metrics for various types of equipment. For example, an equipment model for a chiller in a HVAC system may be used to predict a variable of interest for the chiller (e.g., power consumption, efficiency, etc.) of the chiller as a function of one or more predictor variables (e.g., chiller load, temperature setpoint, etc.). The accuracy of equipment models can have a strong impact on the performance of any system that relies upon the modeled information. For example, a model-based control methodology may use equipment models to optimally distribute loads across multiple devices based on the modeled performance of each device. If the equipment or system is no longer accurately represented by the model, the prediction capabilities may diminish and the model-based control methodology may be suboptimal. It is difficult and challenging to identify when an equipment model has diminished prediction capability.

SUMMARY

One implementation of the present disclosure is a system for adaptively updating a predictive model for building equipment or a collection of building equipment. The system includes an operating data aggregator module configured to collect a first set of operating data for the building equipment corresponding to a first time period and a second set of operating data for the building equipment corresponding to a second time period. The system further includes a model generator module configured to generate a first set of model coefficients for the predictive model using the first set of operating data and a second set of model coefficients for the predictive model using the second set of operating data. The system further includes a test statistic module configured to generate a test statistic based on a difference between the first set of model coefficients and the second set of model coefficients and a critical value module configured to calculate a critical value for the test statistic. The system further includes a hypothesis testing module configured to perform a statistical hypothesis test. The statistical hypothesis test may include comparing the test statistic with the critical value to determine whether the predictive model has changed. The system further includes a model update module configured to adaptively update the predictive model in response to a determination that the test statistic exceeds the critical value.

In some embodiments, adaptively updating the predictive model includes generating a new set of model coefficients for the predictive model, determining whether the new set of model coefficients improves a fit of the predictive model to a set of operating data relative to a previous set of model coefficients used in the predictive model, and replacing the previous set of model coefficients with the new set of model coefficients in the predictive model in response to a determination that the new set of model coefficients improves the fit of the predictive model. In some embodiments, adaptively updating the predictive model includes retaining the previous set of model coefficients in the predictive model in response to a determination that the new set of model coefficients does not improve the fit of the predictive model. In some embodiments, adaptively updating the predictive model includes replacing the previous set of model coefficients with the new set of model coefficients if the fit of the new set of model coefficients is within a threshold. In this way, the new set of model coefficients may be used even if the fit is not improved, so long as the fit provided by the new set of model coefficients is within the threshold.

In some embodiments, calculating the critical value includes identifying a parameter representing a predetermined likelihood that the statistical hypothesis test improperly rejects a null hypothesis that the predictive model has not changed. Calculating the critical value may further include using an inverse cumulative distribution function for the test statistic to determine, based on the parameter, the critical value for the test statistic such that the test statistic has the predetermined likelihood of exceeding the critical value when the predictive model has not changed.

In some embodiments, the model generator module is configured to adjust at least one of the first time period and the second time period to define an adjusted time period based on a current time. The model generator module may further be configured to iteratively update at least one of the first set of model coefficients and the second set of model coefficients using a set of the operating data corresponding to the adjusted time period.

In some embodiments, the system includes a demand response module configured to use the updated predictive model to generate a control output for the building equipment using a model-based control methodology.

In some embodiments, the system includes an autocorrelation corrector configured to remove an autocorrelated model error from at least one of the first set of operating data and the second set of operating data prior to the model generator module determining the sets of model coefficients. In some embodiments, removing the autocorrelated model error includes determining a residual error representing a difference between an actual output of the building equipment and an output predicted by the predictive model, using the residual error to calculate a lag one autocorrelation for the model error, and transforming at least one of the first set of operating data and the second set of operating data using the lag one autocorrelation.

Another implementation of the present disclosure is system for detecting a fault in a predictive model for building equipment or a collection of building equipment. The system includes an operating data aggregator module configured to collect a first set of operating data for the building equipment corresponding to a first time period and a second set of operating data for the building equipment corresponding to a second time period. The system further includes a model generator module configured to generate a first set of model coefficients for the predictive model using the first set of operating data and a second set of model coefficients for the predictive model using the second set of operating data. The system further includes a test statistic module configured to generate a test statistic based on a difference between the first set of model coefficients and the second set of model coefficients and a critical value module configured to calculate a critical value for the test statistic. The system further includes a hypothesis testing module configured to perform a statistical hypothesis test. The statistical hypothesis test may include comparing the test statistic with the critical value to determine whether the predictive model has changed. The system further includes a fault detection module configured to generate a fault indication in response to a determination that the test statistic exceeds the critical value.

In some embodiments, generating the fault indication includes generating a fault event indicating that the predictive model has changed and appending to the fault event a statistical confidence that the predictive model has changed. The statistical confidence may be based on a parameter of the statistical hypothesis test.

In some embodiments, calculating the critical value includes identifying a parameter representing a predetermined likelihood that the statistical hypothesis test improperly rejects a null hypothesis that the predictive model has not changed. Calculating the critical value may further include using an inverse cumulative distribution function for the test statistic to determine, based on the parameter, the critical value for the test statistic such that the test statistic has the predetermined likelihood of exceeding the critical value when the predictive model has not changed.

In some embodiments, the model generator module is configured to adjust at least one of the first time period and the second time period to define an adjusted time period based on a current time. The model generator module may be configured to iteratively update at least one of the first set of model coefficients and the second set of model coefficients using a set of the operating data corresponding to the adjusted time period.

In some embodiments, the system includes a demand response module configured to use the updated predictive model to generate a control output for the building equipment using a model-based control methodology.

In some embodiments, the system includes an autocorrelation corrector configured to remove an autocorrelated model error from at least one of the first set of operating data and the second set of operating data prior to the model generator module determining the sets of model coefficients.

Another implementation of the present disclosure is a method for identifying changes in a predictive model for building equipment or a system including a collection of building equipment. The method includes collecting, by an operating data aggregator module of an equipment model adaptation system, a first set of operating data for the building equipment corresponding to a first time period and a second set of operating data for the building equipment corresponding to a second time period. The method further includes generating, by a model generator module of the equipment model adaptation system, a first set of model coefficients for the predictive model using the first set of operating data and a second set of model coefficients for the predictive model using the second set of operating data. The method further includes generating, by a test statistic module of the equipment model adaptation system, a test statistic based on a difference between the first set of model coefficients and the second set of model coefficients. The method further includes calculating, by a critical value module of the equipment model adaptation system, a critical value for the test statistic. The method further includes comparing, by a hypothesis testing module of the equipment model adaptation system, the test statistic with the critical value using a statistical hypothesis test to determine whether the predictive model has changed. The method further includes triggering an action performed by the equipment model adaptation system in response to the test statistic exceeding the critical value. The action includes at least one of generating a fault indication and adaptively updating the predictive model.

In some embodiments, the action includes adaptively updating the predictive model. Adaptively updating the predictive model may include generating a new set of model coefficients for the predictive model and determining whether the new set of model coefficients improves a fit of the predictive model to a set of operating data relative to a previous set of model coefficients used in the predictive model. Adaptively updating the predictive model may further include replacing the previous set of model coefficients with the new set of model coefficients in the predictive model in response to a determination that the new set of model coefficients improves the fit of the predictive model or retaining the previous set of model coefficients in the predictive model in response to a determination that the new set of model coefficients does not improve the fit of the predictive model. In some embodiments, adaptively updating the predictive model includes replacing the previous set of model coefficients with the new set of model coefficients if the fit of the new set of model coefficients is within a threshold. In this way, the new set of model coefficients may be used even if the fit is not improved, so long as the fit provided by the new set of model coefficients is within the threshold.

In some embodiments, the action includes generating the fault indication. Generating the fault indication may include generating a fault event indicating that the predictive model has changed and appending to the fault event a statistical confidence that the predictive model has changed. The statistical confidence may be based on a parameter of the statistical hypothesis test.

In some embodiments, the test statistic is an F-statistic based on the difference between the first set of model coefficients and the second set of model coefficients.

In some embodiments, calculating the critical value includes identifying a parameter representing a predetermined likelihood that the statistical hypothesis test improperly rejects a null hypothesis that the predictive model has not changed. Calculating the critical value may further include using an inverse cumulative distribution function for the test statistic to determine, based on the parameter, the critical value for the test statistic such that the test statistic has the predetermined likelihood of exceeding the critical value when the predictive model has not changed.

In some embodiments, the method includes removing an autocorrelated model error from at least one of the first set of operating data and the second set of operating data prior to determining the sets of model coefficients.

Those skilled in the art will appreciate that the summary is illustrative only and is not intended to be in any way limiting. Other aspects, inventive features, and advantages of the devices and/or processes described herein, as defined solely by the claims, will become apparent in the detailed description set forth herein and taken in conjunction with the accompanying drawings.

DETAILED DESCRIPTION

Figure 1:
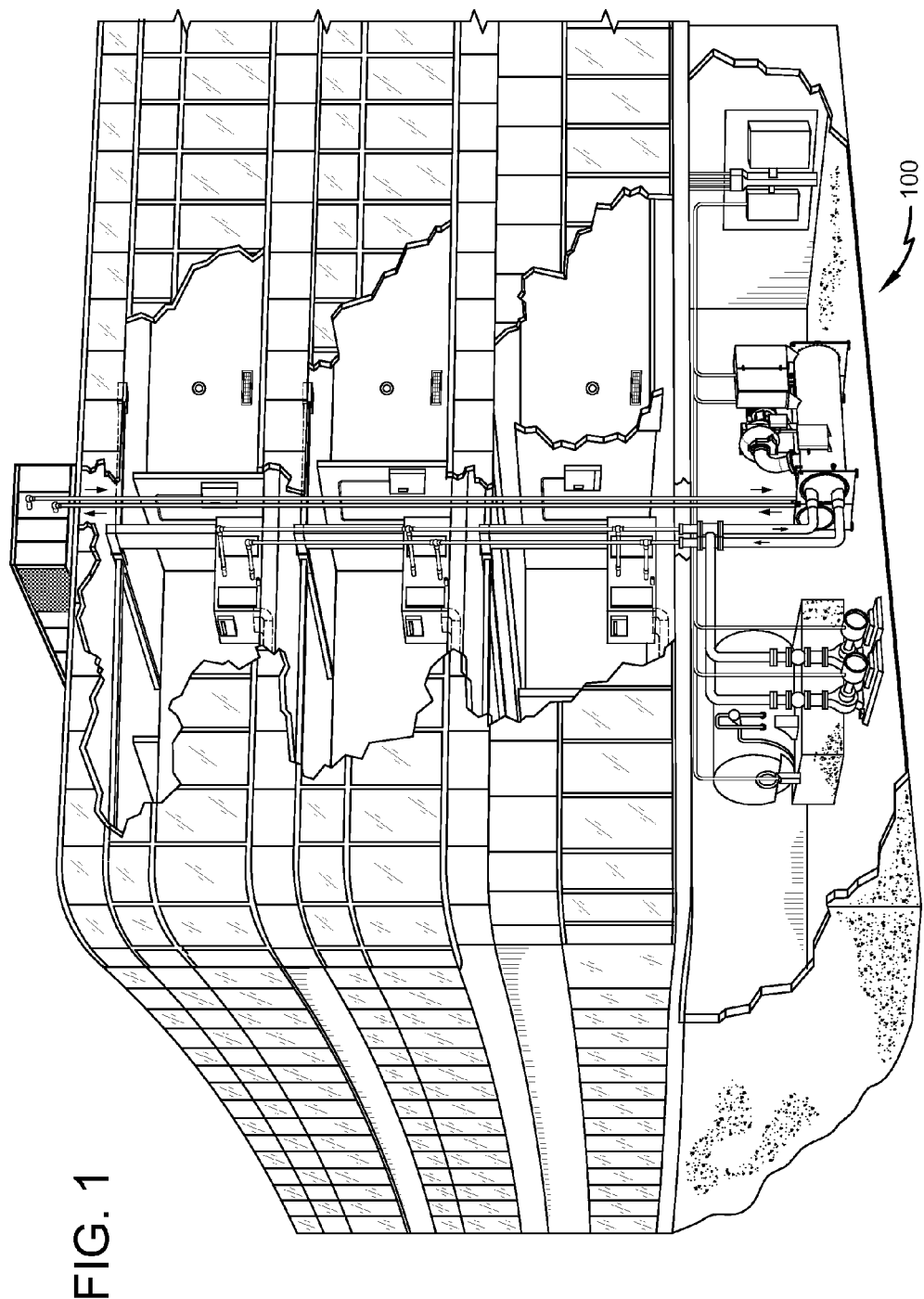
FIG. 1 is a drawing of a building equipped with a building management system (BMS) including various types of building equipment for monitoring and/or controlling conditions within the building, according to an exemplary embodiment.

Referring generally to the FIGURES, systems and methods for adaptively updating equipment models are shown, according to various exemplary embodiments. Equipment models are used to predict performance metrics for various types of equipment. For example, an equipment model for a chiller in a HVAC system may be used to predict a variable of interest for the chiller (e.g., power consumption, efficiency, etc.) of the chiller as a function of one or more predictor variables (e.g., chiller load, temperature setpoint, etc.). The accuracy of equipment models can have a strong impact on the performance of any system that relies upon the modeled information. For example, a model-based control methodology may use equipment models to optimally distribute loads across multiple devices based on the modeled performance of each device. If the equipment or system is no longer accurately represented by the model, the prediction capabilities may diminish and the model-based control methodology may be suboptimal. The systems and methods described herein can be used to identify when an equipment model no longer accurately represents the modeled equipment.

In some embodiments, equipment models are generated using a set of operating data from the building equipment. The operating data may include values for one or more independent variables (i.e., predictor variables) provided as inputs to the equipment models and one or more dependent variables (i.e., variables of interest) predicted by the equipment models. A regression technique can be used to generate a set of model coefficients $\hat{\beta}$ that fits the operating data. In some embodiments, a first set of operating data corresponding to a first time period is used to generate a first set of model coefficients $\hat{\beta}_1$ for an equipment model. A second set of operating data corresponding to a second time period may be used to generate a second set of model coefficients $\hat{\beta}_2$ for the same equipment model. Each set of model coefficients may be represented by a vector consisting of random variables.

In some embodiments, a test statistic is generated to determine whether the predictive model has changed. The test statistic may be an F-statistic $F_{\Delta\beta}$ based on a difference $\Delta\beta$ between the first set of model coefficients and the second set of model coefficients. Statistical hypothesis testing may be performed using the test statistic $F_{\Delta\beta}$ to determine whether the predictive model has changed. For example, a critical value $f_{crit}$ may be calculated using an inverse cumulative distribution function for the test statistic. The critical value $f_{crit}$ may be selected such that the test statistic $F_{\Delta\beta}$ has a predetermined statistical likelihood of being less than the critical value when the predictive model has not changed. In some embodiments, the systems and methods described herein formulate a null hypothesis that the predictive model has not changed. The null hypothesis may be rejected in response to a determination that the test statistic $F_{\Delta\beta}$ exceeds the critical value $f_{crit}$.

In some embodiments, the systems and methods of the present disclosure generate a fault event in response to rejecting the null hypothesis. The fault event may indicate that the predictive model has changed and may include the predetermined statistical likelihood that the null hypothesis was properly rejected. The fault event can be reported to a user, stored in memory, or otherwise used in various fault detection and diagnostic processes.

In some embodiments, the systems and methods of the present disclosure adaptively update the equipment model in response to rejecting the null hypothesis. Adaptively updating the equipment model may include generating a new set of model coefficients for the equipment model based on a recent set of operating data. In some embodiments, the new set of model coefficients are automatically applied to the equipment model. In other embodiments, the systems and methods described herein determine whether the new set of model coefficients result in a better fit of the predictive model to the set of operating data relative to an existing set of model coefficients used by the model. If the new set of model coefficients result in a better fit, the new set of model coefficients may be applied to the equipment model (e.g., replacing the existing set of model coefficients). However, if the new set of model coefficients does not result in a better fit, the existing set of model coefficients may be retained in the equipment model. In some embodiments, the new set of model coefficients may be applied to the equipment model even if the fit is not improved, so long as the fit provided by the new set of model coefficients is within a threshold.

Referring now to FIG. 1, a perspective view of a building 100 is shown, according to an exemplary embodiment. A building automation system (BAS) serves building 100. In general, a BAS includes hardware and/or software configured to control, monitor, and manage devices in or around a building or building area. BAS subsystems or devices can include heating, ventilation, and air conditioning (HVAC) subsystems or devices, security subsystems or devices, lighting subsystems or devices, fire alerting subsystems or devices, elevator subsystems or devices, other devices that are capable of managing building functions, or any combination thereof. Throughout this disclosure, BAS subsystems and devices are referred to as building equipment.

Figure 2:
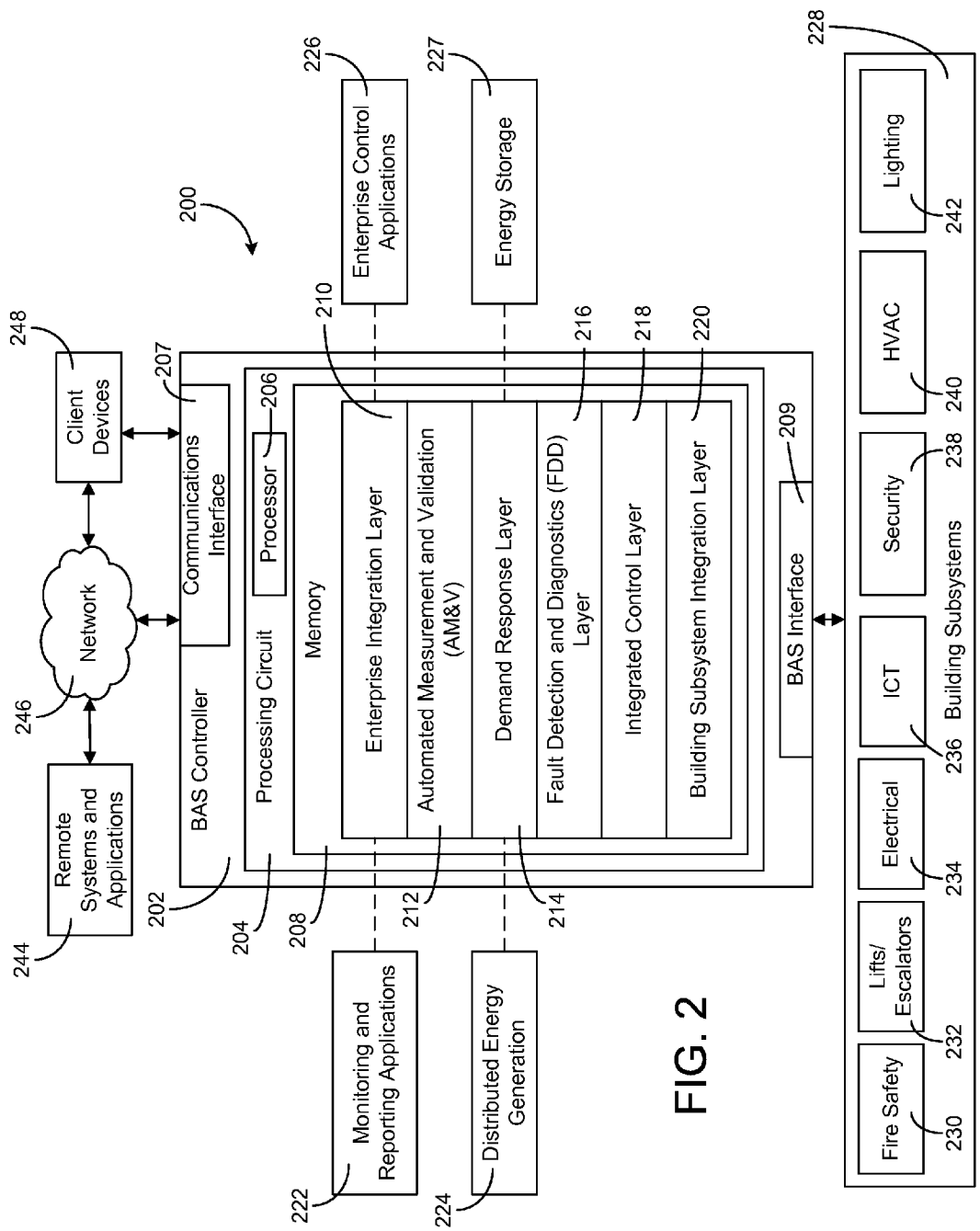
FIG. 2 is a block diagram illustrating the BMS of FIG. 1 in greater detail including a BMS controller and a plurality of building subsystems, according to an exemplary embodiment.

Referring now to FIG. 2, a block diagram of a building automation system 200 including a BAS controller 202 and a plurality of building subsystems 228 is shown, according to an exemplary embodiment. Building subsystems 228 are shown to include a building electrical subsystem 234, an information communication technology (ICT) subsystem 236, a security subsystem 238, a HVAC subsystem 240, a lighting subsystem 242, a lift/escalators subsystem 232, and a fire safety subsystem 230. In various embodiments, building subsystems 228 can include fewer, additional, or alternative subsystems. For example, building subsystems 228 may also or alternatively include a refrigeration subsystem, an advertising or signage subsystem, a cooking subsystem, a vending subsystem, a printer or copy service subsystem, or any other type of building subsystem that uses controllable equipment and/or sensors to monitor or control building 100. BAS controller 202 may be configured to achieve energy consumption and energy demand reductions by integrating the management of building subsystems 228.

Each of building subsystems 228 may include any number of devices, controllers, and connections for completing its individual functions and control activities. For example, HVAC subsystem 240 may include a chiller, a boiler, any number of air handling units, economizers, field controllers, supervisory controllers, actuators, temperature sensors, and other devices for controlling the temperature within a building. As another example, lighting subsystem 242 may include any number of light fixtures, ballasts, lighting sensors, dimmers, or other devices configured to controllably adjust the amount of light provided to a building space. Security subsystem 238 may include occupancy sensors, video surveillance cameras, digital video recorders, video processing servers, intrusion detection devices, access control devices and servers, or other security-related devices.

Still referring to FIG. 2, BAS controller 202 is shown to include a communications interface 207 and a BAS interface 209. Interface 207 may facilitate communications between BAS controller 202 and external applications (e.g., monitoring and reporting applications 222, enterprise control applications 226, remote systems and applications 244, applications residing on client devices 248, etc.) for allowing user control, monitoring, and adjustment to BAS controller 202 and/or subsystems 228. Interface 207 may also facilitate communications between BAS controller 202 and client devices 248. BAS interface 209 may facilitate communications between BAS controller 202 and building subsystems 228 (e.g., HVAC, lighting security, lifts, power distribution, business, etc.).

Interfaces 207, 209 can be or include wired or wireless communications interfaces (e.g., jacks, antennas, transmitters, receivers, transceivers, wire terminals, etc.) for conducting data communications with building subsystems 228 or other external systems or devices. In various embodiments, communications via interfaces 207, 209 may be direct (e.g., local wired or wireless communications) or via a communications network 246 (e.g., a WAN, the Internet, a cellular network, etc.). For example, interfaces 207, 209 can include an Ethernet card and port for sending and receiving data via an Ethernet-based communications link or network. In another example, interfaces 207, 209 can include a WiFi transceiver for communicating via a wireless communications network. In another example, one or both of interfaces 207, 209 may include cellular or mobile phone communications transceivers. In one embodiment, communications interface 207 is a power line communications interface and BAS interface 209 is an Ethernet interface. In other embodiments, both communications interface 207 and BAS interface 209 are Ethernet interfaces or are the same Ethernet interface.

Still referring to FIG. 2, BAS controller 202 is shown to include a processing circuit 204. Processing circuit 204 may be communicably connected to BAS interface 209 and/or communications interface 207 such that processing circuit 204 and the various components thereof can send and receive data via interfaces 207, 209.

Processing circuit 204 is shown to include a processor 206 and memory 208. Processor 206 can be implemented as a general purpose processor, an application specific integrated circuit (ASIC), one or more field programmable gate arrays (FPGAs), a group of processing components, or other suitable electronic processing components. Memory 208 (e.g., memory, memory unit, storage device, etc.) may include one or more devices (e.g., RAM, ROM, Flash memory, hard disk storage, etc.) for storing data and/or computer code for completing or facilitating the various processes, layers and modules described in the present application. Memory 208 may be or include volatile memory or non-volatile memory. Memory 208 may include database components, object code components, script components, or any other type of information structure for supporting the various activities and information structures described in the present application. According to an exemplary embodiment, memory 208 is communicably connected to processor 206 via processing circuit 204 and includes computer code for executing (e.g., by processing circuit 204 and/or processor 206) one or more processes described herein.

In an exemplary embodiment, BAS controller 202 is integrated within a single computer (e.g., one server, one housing, etc.). In various other exemplary embodiments BAS controller 202 can be distributed across multiple servers or computers (e.g., that can exist in distributed locations). Further, while FIG. 2 shows applications 222 and 226 as existing outside of BAS controller 202, in some embodiments, applications 222 and 226 may be hosted within BAS controller 202 (e.g., within a memory device).

Still referring to FIG. 2, memory 208 is shown to include an enterprise integration layer 210, an automated measurement and validation (AM&V) layer 212, a demand response (DR) layer 214, a fault detection and diagnostics (FDD) layer 216, an integrated control layer 218, and a building subsystem integration later 220. Layers 210-220 may be configured to receive inputs from building subsystems 228 and other data sources, determine optimal control actions for building subsystems 228 based on the inputs, generate control signals based on the optimal control actions, and provide the generated control signals to building subsystems 228. The following paragraphs describe some of the general functions performed by each of layers 210-220 in BAS 200.

Enterprise integration layer 210 may be configured to serve clients or local applications with information and services to support a variety of enterprise-level applications. For example, enterprise control applications 226 may be configured to provide subsystem-spanning control to a graphical user interface (GUI) or to any number of enterprise-level business applications (e.g., accounting systems, user identification systems, etc.). Enterprise control applications 226 may also or alternatively be configured to provide configuration GUIs for configuring BAS controller 202. In yet other embodiments, enterprise control applications 226 can work with layers 210-220 to optimize building performance (e.g., efficiency, energy use, comfort, or safety) based on inputs received at interface 207 and/or BAS interface 209.

Building subsystem integration layer 220 may be configured to manage communications between BAS controller 202 and building subsystems 228. For example, building subsystem integration layer 220 may receive sensor data and input signals from building subsystems 228 and provide output data and control signals to building subsystems 228. Building subsystem integration layer 220 may also be configured to manage communications between building subsystems 228. Building subsystem integration layer 220 translate communications (e.g., sensor data, input signals, output signals, etc.) across a plurality of multi-vendor/multi-protocol systems.

Demand response layer 214 may be configured to optimize resource usage (e.g., electricity use, natural gas use, water use, etc.) and/or the monetary cost of such resource usage in response to satisfy the demand of building 100. The optimization may be based on time-of-use prices, curtailment signals, energy availability, or other data received from utility providers, distributed energy generation systems 224, from energy storage 227, or from other sources. Demand response layer 214 may receive inputs from other layers of BAS controller 202 (e.g., building subsystem integration layer 220, integrated control layer 218, etc.). The inputs received from other layers may include environmental or sensor inputs such as temperature, carbon dioxide levels, relative humidity levels, air quality sensor outputs, occupancy sensor outputs, room schedules, and the like. The inputs may also include inputs such as electrical use (e.g., expressed in kWh), thermal load measurements, pricing information, projected pricing, smoothed pricing, curtailment signals from utilities, and the like.

According to an exemplary embodiment, demand response layer 214 includes control logic for responding to the data and signals it receives. These responses can include communicating with the control algorithms in integrated control layer 218, changing control strategies, changing setpoints, or activating/deactivating building equipment or subsystems in a controlled manner. Demand response layer 214 may also include control logic configured to determine when to utilize stored energy. For example, demand response layer 214 may determine to begin using energy from energy storage 227 just prior to the beginning of a peak use hour.

In some embodiments, demand response layer 214 includes a control module configured to actively initiate control actions (e.g., automatically changing setpoints) which minimize energy costs based on one or more inputs representative of or based on demand (e.g., price, a curtailment signal, a demand level, etc.). Demand response layer 214 may further include or draw upon one or more demand response policy definitions (e.g., databases, XML files, etc.). The policy definitions may be edited or adjusted by a user (e.g., via a graphical user interface) so that the control actions initiated in response to demand inputs may be tailored for the user's application, desired comfort level, particular building equipment, or based on other concerns. For example, the demand response policy definitions can specify which equipment may be turned on or off in response to particular demand inputs, how long a system or piece of equipment should be turned off, what setpoints can be changed, what the allowable set point adjustment range is, how long to hold a high demand setpoint before returning to a normally scheduled setpoint, how close to approach capacity limits, which equipment modes to utilize, the energy transfer rates (e.g., the maximum rate, an alarm rate, other rate boundary information, etc.) into and out of energy storage devices (e.g., thermal storage tanks, battery banks, etc.), and when to dispatch on-site generation of energy (e.g., via fuel cells, a motor generator set, etc.).

In some embodiments, demand response layer 214 uses equipment models to determine an optimal set of control actions. The equipment models may be used to predict various performance metrics such as power or efficiency for BAS devices. Advantageously, BAS controller 202 may be configured to adaptively adjust the equipment models used by demand response layer 214 to improve the accuracy of the equipment models. This process is described in greater detail with reference to FIGS. 3-4.

Integrated control layer 218 may be configured to use the data input or output of building subsystem integration layer 220 and/or demand response later 214 to make control decisions. Due to the subsystem integration provided by building subsystem integration layer 220, integrated control layer 218 can integrate control activities of the subsystems 228 such that the subsystems 228 behave as a single integrated supersystem. In an exemplary embodiment, integrated control layer 218 includes control logic that uses inputs and outputs from a plurality of building subsystems to provide greater comfort and energy savings relative to the comfort and energy savings that separate subsystems could provide alone. For example, integrated control layer 218 may be configured to use an input from a first subsystem to make an energy-saving control decision for a second subsystem. Results of these decisions can be communicated back to building subsystem integration layer 220.

Integrated control layer 218 is shown to be logically below demand response layer 214. Integrated control layer 218 may be configured to enhance the effectiveness of demand response layer 214 by enabling building subsystems 228 and their respective control loops to be controlled in coordination with demand response layer 214. This configuration may advantageously reduce disruptive demand response behavior relative to conventional systems. For example, integrated control layer 218 may be configured to assure that a demand response-driven upward adjustment to the setpoint for chilled water temperature (or another component that directly or indirectly affects temperature) does not result in an increase in fan energy (or other energy used to cool a space) that would result in greater total building energy use than was saved at the chiller.

Integrated control layer 218 may be configured to provide feedback to demand response layer 214 so that demand response layer 214 checks that constraints (e.g., temperature, lighting levels, etc.) are properly maintained even while demanded load shedding is in progress. The constraints may also include setpoint or sensed boundaries relating to safety, equipment operating limits and performance, comfort, fire codes, electrical codes, energy codes, and the like. Integrated control layer 218 is also logically below fault detection and diagnostics layer 216 and automated measurement and validation layer 212. Integrated control layer 218 may be configured to provide calculated inputs (e.g., aggregations) to these higher levels based on outputs from more than one building subsystem.

Fault detection and diagnostics (FDD) layer 216 may be configured to provide on-going fault detection of building subsystems, building subsystem devices, and control algorithms used by demand response layer 214 and integrated control layer 218. FDD layer 216 may receive its inputs from integrated control layer 218, directly from one or more building subsystems or devices, or from another data source. FDD layer 216 may automatically diagnose and respond to detected faults. The responses to detected or diagnosed faults may include providing an alert message to a user, a maintenance scheduling system, or a control algorithm configured to attempt to repair the fault or to work-around the fault. In other exemplary embodiments FDD layer 216 is configured to provide "fault" events to integrated control layer 218 which executes control strategies and policies in response to the received fault events. According to an exemplary embodiment, FDD layer 216 (or a policy executed by an integrated control engine or business rules engine) may shut-down systems or direct control activities around faulty devices or systems to reduce energy waste, extend equipment life, or assure proper control response.

FDD layer 216 may be configured to store or access a variety of different system data stores (or data points for live data). FDD layer 216 may use some content of the data stores to identify faults at the equipment level (e.g., specific chiller, specific AHU, specific terminal unit, etc.) and other content to identify faults at component or subsystem levels.

FDD layer 216 may be configured to output a specific identification of the faulty component or cause of the fault (e.g., loose damper linkage) using detailed subsystem inputs available at building subsystem integration layer 220.

FDD layer 216 may use any of a variety of fault detection and diagnostic techniques. For example, FDD layer 216 may be configured to use a statistical analysis of equipment model coefficients to identify faults in equipment operation. This process is described in greater detail with reference to FIG. 3. In other embodiments, FDD layer 216 can utilize pattern recognition methods, pattern classification methods, rule-based classification methods, outlier analysis, statistical quality control charting techniques, or the like to conduct its statistical analysis.

Automated measurement and validation (AM&V) layer 212 may be configured to verify that control strategies commanded by integrated control layer 218 or demand response layer 214 are working properly (e.g., using data aggregated by AM&V layer 212, integrated control layer 218, building subsystem integration layer 220, FDD layer 216, or otherwise). The calculations made by AM&V layer 212 may be based on building system energy models and/or equipment models for individual BAS devices or subsystems. For example, AM&V layer 212 may compare a model-predicted output with an actual output from building subsystems 228 to determine an accuracy of the model. In some embodiments, AM&V layer 212 determines whether a new set of model coefficients for an equipment model fits a set of operating data better than a previous set of model coefficients. If the new set of model coefficients provides a better fit, AM&V layer 212 may initiate a refitting operation. This process is described in greater detail with reference to FIGS. 3-4

Figure 3:
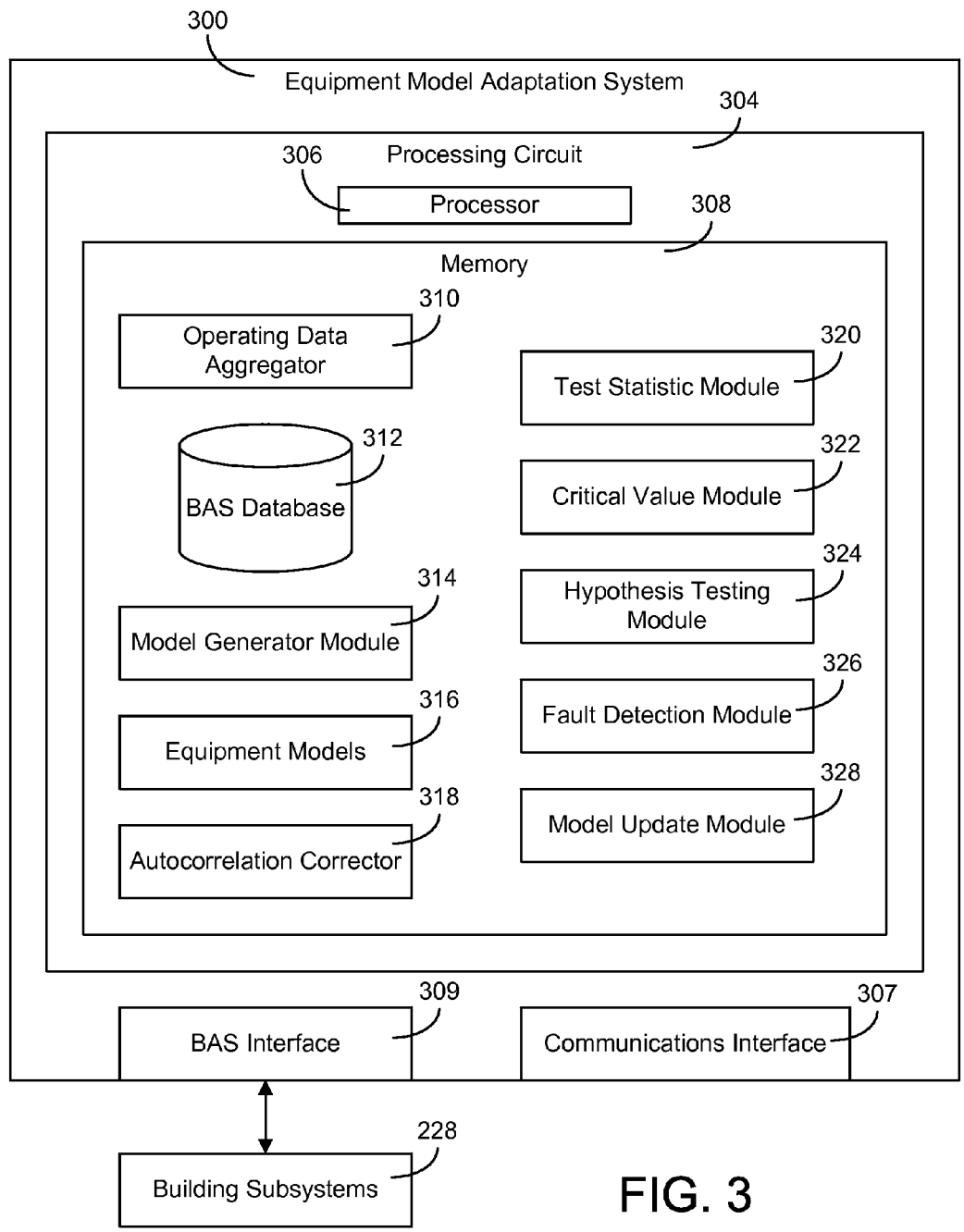
FIG. 3 is a block diagram of an equipment model adaptation system that may be implemented as part of the BMS controller of FIG. 2, according to an exemplary embodiment.

Referring now to FIG. 3, a block diagram illustrating an equipment model adaptation system 300 is shown, according to an exemplary embodiment. In some embodiments, system 300 is a component of BAS controller 202 (e.g., implemented as a memory module within BAS controller 202). In various other embodiments, system 300 may be a component of an integrated controller for building equipment (e.g., a single piece of equipment, a collection of equipment, etc.), a field controller, a supervisory controller, an enterprise-level controller, a client device (e.g., a computer terminal, a desktop computer, a laptop computer, a portable device, etc.) or any other system or device capable of performing the functions described herein. In an exemplary embodiment, system 300 is integrated within a single computer (e.g., one server, one housing, etc.). In various other exemplary embodiments, system 300 can be distributed across multiple servers or computers (e.g., that can exist in distributed locations).

System 300 may be configured to use statistical hypothesis testing to detect a change in a predictive model for building equipment or a collection of building equipment. For example, system 300 may use a first set of operating data to generate a first set of model coefficients for the predictive model and a second set of operating data to generate a second set of model coefficients for the predictive model. System 300 may generate a test statistic based on the sets of model coefficients and compare the test statistic with a critical value. In response to the test statistic exceeding the critical value, system 300 may determine that the predictive model has changed. Upon determining that the predictive model has changed, system 300 may generate a fault indication and/or adaptively update the predictive model with a new set of model coefficients.

Still referring to FIG. 3, system 300 is shown to include a communications interface 307, a BAS interface 309, and a processing circuit 304. Communications interface 307 and BAS interface 309 may be the same or similar to interfaces 207 and 209, respectively, as described with reference to FIG. 2. Processing circuit 304 may be communicably connected to BAS interface 309 and/or communications interface 307 such that processing circuit 304 and the various components thereof can send and receive data via interfaces 307, 309.

Processing circuit 304 is shown to include a processor 306 and memory 308. Processor 306 can be implemented as a general purpose processor, an application specific integrated circuit (ASIC), one or more field programmable gate arrays (FPGAs), a group of processing components, or other suitable electronic processing components. Memory 308 (e.g., memory, memory unit, storage device, etc.) may include one or more devices (e.g., RAM, ROM, Flash memory, hard disk storage, etc.) for storing data and/or computer code for completing or facilitating the various processes, layers and modules described in the present application. Memory 308 may be or include volatile memory or non-volatile memory. Memory 308 may include database components, object code components, script components, or any other type of information structure for supporting the various activities and information structures described in the present application. According to an exemplary embodiment, memory 308 is communicably connected to processor 306 via processing circuit 304 and includes computer code for executing (e.g., by processing circuit 304 and/or processor 306) one or more processes described herein.

Still referring to FIG. 3, memory 308 is shown to include an operating data aggregator 310. Operating data aggregator 310 may serve as middleware configured to normalize communications or data received from interfaces 307, 309. In some embodiments, operating data aggregator 310 is a middleware appliance or module sold by Johnson Controls, Inc. Operating data aggregator 310 may be configured to add operating data from building subsystems 228 to a BAS database 312. Values for the operating data may be measured by sensors, derived from measured values, and/or calculated by various components of BAS 200 or system 300 based on the actual operation of building subsystems 228. Operating data aggregator 310 may add timestamps to each of the stored values indicating a time at which the value was measured or otherwise obtained. The timestamps may be used to identify operating data corresponding to a particular time window for use in subsequent data processing and analysis.

BAS database 312 may be a data storage system or device configured to store values for the operating data. In various embodiments, BAS database 312 may be a component of memory 308 or a separate database. Operating data may include measured or calculated values for one or more independent variables (i.e., predictor variables $x_1$, $x_2$, $x_3$, . . . $x_p$) that affect the performance of building equipment. For example, independent variables stored in BAS database 312 may include device setpoints, load variables, operating conditions, or any other controlled or uncontrolled variable that affects the performance of the building equipment. Operating data may further include values for one or more dependent variables (i.e., a performance metric $y$) that depend on the independent variables. Dependent variables stored in BAS database 312 may include, for example, power consumption, resource usage, operating efficiency, or any other variable of interest that depends on one or more of the independent variables.

The relationships between independent and dependent variables stored in BAS database 312 may be defined by equipment models 316. Equipment models 316 are mathematical models that can be used by system 300 and/or BAS controller 202 to predict various performance metrics for the building equipment. Equipment models 316 may have many forms, one of which is a polynomial as shown in the following equation:

$$y=\beta_0+\beta_1 z+\beta_2 z^2+\ldots+\beta_p z^p+\epsilon$$

where y is the dependent variable predicted by the equipment model (e.g., a performance metric such as power consumption, operating efficiency, etc.), z is the independent variable (e.g., a predictor variable such as device load), the β parameters are the model coefficients, and ε is the error between the actual value of y and a model predicted value. The model coefficients $\beta_0 \ldots \beta_p$ may be determined (e.g., by model generator module 314) by fitting the operating data from BAS database 312 to the equipment model (described in greater detail below). Note that the preceding equation is linear in the β parameters and therefore can be rewritten as:

$$y=\beta_0+\beta_1 x_1+\beta_2 x_2+\ldots+\beta_p x_p+\epsilon$$

where $x_1=z$, $x_2=z^2$, and $x_p=z^p$

Operating data aggregator 310 may collect values for each of the dependent and independent variables in BAS database 312 for a plurality of time steps i. Extending the previous equation from one data sample to n samples in time gives n equations of the form:

$$y_i=\beta_0+\beta_1 x_{i1}+\beta_2 x_{i2}+\ldots+\beta_p x_{ip}+\epsilon_i$$

where i=1 . . . n.

The n equations can be arranged in matrix form as shown in the following equation:

$$Y = X\beta + \varepsilon, \varepsilon \sim N(0, \sigma^2 I)$$

where $$Y = \begin{bmatrix} y_1 \\ y_2 \\ \vdots \\ y_n \end{bmatrix} X = \begin{bmatrix} x_{11} & \cdots & x_{1p} \\ \vdots & \ddots & \vdots \\ x_{n1} & \cdots & x_{np} \end{bmatrix} \beta = \begin{bmatrix} \beta_1 \\ \beta_2 \\ \vdots \\ \beta_p \end{bmatrix} \varepsilon = \begin{bmatrix} \varepsilon_1 \\ \varepsilon_2 \\ \vdots \\ \varepsilon_n \end{bmatrix}$$

The n×1 vector Y represents the n samples of the dependent variable y. The n×p matrix X contains the samples of the independent or predictor variables upon which the y values are based. The n×1 vector ε is the true model error and is normally distributed with zero mean. In some embodiments, the model errors are uncorrelated and not physically measurable. The p×1 vector β contains the model coefficients.

Still referring to FIG. 3, memory 308 is shown to include a model generator module 314. Model generator module 314 may generate an estimate $\hat{\beta}$ for the model coefficients β that minimizes a function of the model error ε. In some embodiments, model generator module 314 generates the estimated model coefficients $\hat{\beta}$ using a residual sum of squares (RSS) function as defined in the following equation:

$$RSS(\beta)=\Sigma(y_i-x_i\beta)^2=(Y-X\beta)^T(Y-X\beta)$$

Model generator module 314 generate an ordinary least squares (OLS) estimate of the model coefficients $\hat{\beta}$ by finding the model coefficient vector β that minimizes the RSS function. According to various exemplary embodiments, other methods than RSS and/or OLS may be used (e.g., weighted linear regression, regression through the origin, a principal component regression (PCR), ridge regression (RR), partial least squares regression (PLSR), etc.) to generate the model coefficients.

Model generator module 314 may find the vector $\hat{\beta}$ that minimizes the RSS function using the following equation:

$$\hat{\beta}=(X^T X)^{-1} X^T Y$$

Model generator module 314 may store the estimated model coefficients $\hat{\beta}$ as coefficients of the corresponding equipment model in equipment models 316. The operations performed by model generator module 314 to generate model coefficients $\hat{\beta}$ and equipment models 316 are described in greater detail with reference to FIG. 4.

Once equipment models 316 have been updated and/or generated to include model coefficients $\hat{\beta}$, equipment models 316 can be used by system 300 and/or BAS controller 202 to predict the dependent variables in vector $\hat{Y}$. For example, a set of dependent variables $\hat{Y}$ can be predicted for a current set of predictor variables X using the following equation:

$$\hat{Y}=X\hat{\beta}$$

In some embodiments, model generator module 314 determines a set of model coefficients for each of a plurality of different time periods. For example, model generator module 314 may use operating data (i.e., x values and y values) collected during a first time period $T_1$ to estimate a first set of model coefficients $\hat{\beta}_1$. Model generator module 314 may use operating data collected during a second time period $T_2$ to estimate a second set of model coefficients $\hat{\beta}_2$. In various embodiments, time periods $T_1$ and $T_2$ may be discrete time periods or may overlap at least partially. Model coefficients $\hat{\beta}$ for different time periods can be analyzed to determine whether the predictive capabilities of the corresponding equipment model have degraded. Modules 318-324 provide the functionality for such an analysis.

Still referring to FIG. 3, memory 308 is shown to include an autocorrelation corrector 318. One of the assumptions for a linear regression model of the form $Y=X\beta+\epsilon$ is that the model error vector ε is uncorrelated. I.e.:

$$\varepsilon = \begin{bmatrix} \varepsilon_1 \\ \varepsilon_2 \\ \vdots \\ \varepsilon_n \end{bmatrix},$$

$$\text{cov}(\varepsilon_i \varepsilon_j) = 0 \text{ for } i \neq j$$

However, operating data from real equipment may violate this assumption. The model error of equipment models 316 may be correlated for any of a variety of reasons including, for example, missing variables from the model form, system inertia, misspecification of the model form, and pure correlated errors, among others. When autocorrelation is present in the model errors, an ordinary least squares analysis may cause the variance of the coefficient estimates $\hat{\beta}$ to be underestimated, which can adversely impact any statistical analysis of the coefficient estimates.

Autocorrelation corrector 318 may be configured to remove an autocorrelated model error from the operating data in BAS database 312 prior to analyzing the model coefficients. In some embodiments, the errors can be assumed to have an AR(1) model of the form:

$$\epsilon_i=\rho\epsilon_{i-1}+\nu$$

where $\epsilon_i$ is the error at time step i, $\epsilon_{i-1}$ is the error at the previous time step i−1, and $\nu \sim (0,\sigma^2 I)$. Autocorrelation corrector 318 may access equipment models 316 to identify the model coefficient estimates $\hat{\beta}$ and the corresponding residuals e. The residuals e are given by the following equation:

$$e = Y - X\hat{\beta}$$

Autocorrelation corrector 318 may use the residuals e from equipment models 316 as inputs to the AR(1) model (e.g., substituting e for E) and estimate a value for the lag one autocorrelation coefficient $\hat{\rho}$ (e.g., using any of a variety of regression techniques).

Autocorrelation corrector 318 may transform the independent variables $x_i$ and the dependent variables $y_i$ in BAS database 312 using the following transformations:

$$y_i^* = y_i - \rho y_{i-1}$$

$$x_i^* = x_i - \rho x_{i-1}$$

In various embodiments, the transformed variables $x_i^*$ and $y_i^*$ may be stored in BAS database 312 along with the pre-transformed variables $x_i$ and $y_i$ or may replace $x_i$ and $y_i$ in BAS database 312.

In some embodiments, model generator module 314 uses the transformed variables $x_i^*$ and $y_i^*$ to generate a new set of model coefficients $\hat{\beta}^*$. The new set of model coefficients $\hat{\beta}^*$ may be generated in the same manner that the previous set of model coefficients $\hat{\beta}$ was generated, using $x_i^*$ and $y_i^*$ in place of $x_i$ and $y_i$, respectively, in the applicable equations. For example, a transformed independent variable matrix $X^*$ and a transformed dependent variable vector $Y^*$ may be defined as follows:

$$Y^* = \begin{bmatrix} y_1^* \\ y_2^* \\ \vdots \\ y_n^* \end{bmatrix} \quad X^* = \begin{bmatrix} x_{11}^* & \cdots & x_{1p}^* \\ \vdots & \ddots & \vdots \\ x_{n1}^* & \cdots & x_{np}^* \end{bmatrix}$$

The transformed vector $Y^*$ and matrix $X^*$ can be used to calculate the new set of model coefficients $\hat{\beta}^*$ using the following equation:

$$\hat{\beta}^* = (X^{*T} X^*)^{-1} X^{*T} Y^*$$

Still referring to FIG. 3, memory 308 is shown to include a test statistic module 320. Test statistic module 320 may be configured to generate a test statistic for use in comparing multiple sets of model coefficients (e.g., $\hat{\beta}_1$ and $\hat{\beta}_2$). The sets of model coefficients $\hat{\beta}_1$ and $\hat{\beta}_2$ may be generated by model generator module 314 using the equipment operating data stored in BAS database 312 for time periods $T_1$ and $T_2$, respectively. Test statistic module 320 may use the original sets of model coefficients $\hat{\beta}_1$ and $\hat{\beta}_2$ based on the operating data aggregated by operating data aggregator 310 and/or the new sets of model coefficients $\hat{\beta}_1^*$ and $\hat{\beta}_2^*$ based on transformed operating data generated by autocorrelation corrector 318. For simplicity, both types of model coefficients (e.g., based on transformed and non-transformed operating data) are referred to as $\hat{\beta}_1$ and $\hat{\beta}_2$ throughout the remainder of this disclosure.

If the equipment has not undergone any changes between time periods $T_1$ and $T_2$, the two sets of model coefficients $\hat{\beta}_1$ and $\hat{\beta}_2$ may remain relatively constant. However, determining whether a statistically significant change in the model coefficients has occurred can be challenging since $\hat{\beta}_1$ and $\hat{\beta}_2$ are p×1 vectors consisting of random variables. For example, each vector $\hat{\beta}$ may be distributed as:

$$\hat{\beta} \sim N(\beta, \sigma^2 (X^T X)^{-1})$$

Accordingly, the sum of squared error RSS based on $\hat{\beta}$ divided by $\sigma^2$ may be represented by a chi-square distribution:

$$\frac{RSS}{\sigma^2} \sim \chi^2_{n-(p+1)}$$

Test statistic module 320 may generate a test statistic that can be used to determine when the model coefficients have changed with statistical significance. The test statistic may be based on the difference $\Delta\beta$ between model coefficients $\hat{\beta}_1$ and $\hat{\beta}_2$. The difference between model coefficients may be a normally distributed random vector as shown in the following equation:

$$\Delta\beta = (\hat{\beta}_1 - \hat{\beta}_2) \sim N(0, \sigma^2[(X_1^T X_1)^{-1} + (X_2^T X_2)^{-1}])$$

where $\Delta\beta$ is the change in model coefficients between time periods $T_1$ and $T_2$ (e.g., $\Delta\beta = (\hat{\beta}_1 - \hat{\beta}_2)$) and $X_1$ and $X_2$ are matrices of the independent variable samples in time periods $T_1$ and $T_2$, respectively. The quadratic form of such a normally distributed random vector (i.e., a vector where the symmetric matrix defining the quadratic form is given by the inverse of the covariance matrix of the normal random vector) is itself a chi-square distributed random variable with degrees of freedom equal to the length of $\Delta\beta$:

$$\frac{\Delta\beta^T [(X_1^T X_1)^{-1} + (X_2^T X_2)^{-1}]^{-1} \Delta\beta}{\sigma^2} \sim \chi^2_{p+1}$$

The sum of two independent chi-square distributions is itself a chi-square distribution with degrees of freedom equal to the sum of the degrees of freedom of the two original chi-square distributions. Thus, the sum of the two sum of squared errors divided by the original variance is chi-square distributed, as:

$$\frac{RSS_1 + RSS_2}{\sigma^2} \sim \chi^2_{n_1 + n_2 - 2(p+1)}$$

where $n_1$ and $n_2$ are the number of data points used to estimate the model coefficients $\hat{\beta}_1$ and $\hat{\beta}_2$, respectively (equal to the number of rows in $X_1$ and $X_2$) and p is the number of independent variables (equal to the number of columns in $X_1$ and $X_2$).

The ratio of two chi-square distributions divided by their respective degrees of freedom is an F-distributed random variable:

$$F_{\Delta\beta} = \left( \frac{\Delta\beta^T [(X_1^T X_1) + (X_2^T X_2)^{-1}]^{-1} \Delta\beta}{RSS_1 + RSS_2} \right) \left( \frac{n_1 + n_2 - 2p}{p} \right) \sim F_{p, n_1 + n_2 - 2p}$$

where $RSS_1$ and $RSS_2$ are the residual sums of squares for model coefficients $\hat{\beta}_1$ and $\hat{\beta}_2$, respectively, and $F_{\Delta\beta}$ is the test statistic. As $\Delta\beta$ moves away from the origin, $F_{\Delta\beta}$ increases. The maximum increase may occur in the direction of the least variance of the model coefficients and is scaled by the sum of squared errors. Thus, $F_{\Delta\beta}$ may be based on changes in model coefficients which can easily be related back to actual changes in the equipment. The $F_{\Delta\beta}$ statistic may also take into account random variation of the changes of the model coefficients even when the model is stationary. The $F_{\Delta\beta}$ statistic may further be converted into a standard normal variable $Z_{\Delta\beta}$ by the proper transformation function. In various embodiments, either $F_{\Delta\beta}$ or $Z_{\Delta\beta}$ may be used as the test statistic.

Still referring to FIG. 3, memory 308 is shown to include a critical value module 322 and a hypothesis testing module 324. Critical value module 322 may be configured to generate a critical value $f_{crit}$ for the test statistic. Hypothesis testing module 324 may compare the critical value $f_{crit}$ with the test statistic $F_{\Delta\beta}$ using a statistical hypothesis test to determine whether a change in the model coefficients $\Delta\beta$ is statistically significant. For example, hypothesis testing module 324 may formulate a null hypothesis that the model coefficients $\Delta\beta$ have not changed. Hypothesis testing module 324 may reject the null hypothesis in response to a determination that the test statistic $F_{\Delta\beta}$ exceeds the critical value $f_{crit}$.

In some embodiments, critical value module 322 generates the critical value $f_{crit}$ using an inverse cumulative distribution function for the test statistic F. For example, critical value module 322 may calculate the critical value $f_{crit}$ using the following equation:

$$f_{crit} = F_{p+1,n_1+n_2-2(p+1)}^{-1}(1-\alpha)$$

where $F^{-1}$ is the inverse cumulative distribution function for the test statistic and the parameter $\alpha$ represents the probability of a false positive (i.e., incorrectly rejecting the null hypothesis when in fact the model coefficients have not changed) for the statistical hypothesis test. Critical value module 322 may determine the parameter $\alpha$ by identifying an acceptable probability that the null hypothesis will be incorrectly rejected. In various embodiments, a value for the parameter $\alpha$ may be retrieved from memory, specified by a user, and/or calculated based on one or more stored values.

Critical value module 322 may use the parameter $\alpha$ as an input to the inverse cumulative distribution function to determine a critical value $f_{crit}$ that is greater than $(1-\alpha)\%$ of values for the test statistic $F_{\Delta\beta}$ when the null hypothesis is valid. For example, if a value of $\alpha=0.05$ is provided as an input to the inverse cumulative distribution function, the corresponding value for $f_{crit}$ will be greater than $(1-0.05)=0.95$ or 95% of values for the test statistic $F_{\Delta\beta}$ when the null hypothesis is valid.

Hypothesis testing module 324 may compare the critical value $f_{crit}$ with the test statistic $F_{\Delta\beta}$ to determine whether to reject the null hypothesis. If the value of the test statistic is larger than the critical value (i.e., $F_{\Delta\beta} > f_{crit}$), hypothesis testing module 324 may reject the null hypothesis that the model coefficients have not changed. The value for the parameter $\alpha$ defines a statistical confidence $(1-\alpha)$ that the null hypothesis is properly rejected when $f_{crit} > F_{\Delta\beta}$. Thus, if the value of the test statistic is larger than the critical value, hypothesis testing module 324 may determine with $(1-\alpha)\%$ confidence that the model coefficients have changed. If the value of the test statistic is not larger than the critical value (i.e., $F_{\Delta\beta} \leq f_{crit}$), hypothesis testing module 324 may fail to reject the null hypothesis and may determine that the model coefficients have not changed.

Still referring to FIG. 3, memory 308 is shown to include a fault detection module 326. Fault detection module 326 may be configured to detect a fault in equipment models 316 and/or the equipment corresponding to equipment models 316 based on a result of the hypothesis testing performed by hypothesis testing module 324. For example, fault detection module 326 may determine that a fault is detected in response to hypothesis testing module 324 rejecting the null hypothesis. In some embodiments, a detected fault indicates that the equipment is optimizing inefficiently (e.g., due to the equipment model no longer accurately predicting the performance of the equipment) and that the equipment model can be updated to better optimize the performance of the equipment. In some embodiments, a detected fault indicates that the equipment is controlling poorly (e.g., due to a physical change or defect in the equipment itself) and may be in need of repair or replacement.

Fault detection module 326 may automatically diagnose and respond to detected faults. The responses to detected or diagnosed faults may include providing an alert message to a user, a maintenance scheduling system, or a control algorithm configured to attempt to repair the fault or to work-around the fault. In some embodiments, fault detection module 326 is configured to provide "fault" events to various components of system 300, BAS controller 202 (e.g., to integrated control layer 218 which can execute control strategies and policies in response to the received fault events) and/or to an external system or device (e.g., a client device, a user terminal, etc.) via communications interface 307. Fault detection module 326 may report a detected fault and a statistical confidence with which the fault is detected. The statistical confidence may be a function of the a parameter (e.g., $1-\alpha$) used to reject the null hypothesis. In some embodiments, the statistical confidence is used by a fault diagnostic system or a user to determine a likelihood of the detected fault relative to other faults detected in the building automation system.

Still referring to FIG. 3, memory 308 is shown to include a model update module 328. Model update module 328 may be configured to update equipment models 316 based on a result of the hypothesis testing performed by hypothesis testing module 324. For example, model update module 328 may update one of equipment models 316 in response to hypothesis testing module 324 rejecting the null hypothesis with respect to the equipment model. Updating an equipment model may include replacing an existing set of model coefficients $\hat{\beta}_1$ used by the equipment model with a new set of model coefficients $\hat{\beta}_2$. The new set of model coefficients $\hat{\beta}_2$ may be stored in equipment models 316 and used by various components of system 300 and/or BAS controller 202 (e.g., demand response layer 214, integrated control layer 218, etc.) to predict equipment performance and/or execute a model-based control strategy.

In some embodiments, model update module 328 refits the model coefficients in response to a determination that the model coefficients have likely changed. Refitting the model coefficients may include using operating data from BAS database 312 to retrain the predictive model and generate a new set of model coefficients $\hat{\beta}_2$. The predictive model may be retained using new operating data (e.g., new variables, new values for existing variables, etc.) gathered in response to a determination that the model coefficients have likely changed or existing data gathered prior to the determination. In some embodiments, refitting the model coefficients includes using the set of model coefficients $\hat{\beta}_2$ generated for the second time period $T_2$ as the new set of model coefficients (i.e., without performing an additional refit).

In some embodiments, model update module 328 automatically applies the new set of model coefficients $\hat{\beta}_2$ to the corresponding equipment model in response to a determination that the model coefficients have likely changed. In other embodiments, model update module 328 determines whether the new set of model coefficients $\hat{\beta}_2$ is a better fit than a previous set of model coefficients $\hat{\beta}_1$ that would be replaced by the new set of model coefficients $\hat{\beta}_2$. For example, model update module 328 may calculate a coefficient of variation of the root mean square error (CVRMSE) or any other metric that quantifies how well each set of model coefficients fits the equipment model. Model update module 328 may determine that the fit is improved when the new CVRMSE value is less than the previous CVRMSE value (e.g., $CVRMSE_2 < CVRMSE_1$). Model update module 328 may be configured to apply the new set of model coefficients $\hat{\beta}_2$ to the equipment model only if the new set of model coefficients is a better fit than the previous set of model coefficients $\hat{\beta}_1$. If the new set of model coefficients $\hat{\beta}_2$ is not a better fit than the previous set of model coefficients $\hat{\beta}_1$ (e.g., $CVRMSE_2 > CVRMSE_1$), model update module 328 may discard the new set of model coefficients $\hat{\beta}_2$ and retain the previous set of model coefficients $\hat{\beta}_1$.

In some embodiments, model update module 238 replaces the previous set of model coefficients $\hat{\beta}_1$ with the new set of model coefficients $\hat{\beta}_2$ if the fit of the new set of model coefficients is within a threshold (e.g., $CVRMSE_2 <$threshold), even if the fit is not improved. Advantageously, this allows the equipment model to be updated with the new set of model coefficients $\hat{\beta}_2$ in the event that the new set of model coefficients $\hat{\beta}_2$ fit reasonably well (e.g., $CVRMSE_2 = 2.5$, $CVRMSE_2 <$threshold) but not as well as the previous set of model coefficients $\hat{\beta}_1$ (e.g., $CVRMSE_1 = 2$). Updating the equipment model in this scenario may improve prediction accuracy and may be desirable, even if the fit is not improved.

Model update module 328 may be configured to cause other modules of memory 308 to perform their functions on a periodic basis (e.g., once per day, once per week, once per month, etc.) or on demand (e.g., in response to user input). For example, model update module 328 may trigger operating data aggregator 310 to collect operating data from building subsystems 228 for various time periods and store the operating data in BAS database 312. Model update module 328 may cause model generator module 314 to generate one or more sets of model coefficients based on the collected operating data.

Model update module 328 may cause test statistic module 320 to generate a test statistic comparing multiple sets of model coefficients and may cause critical value module 322 to generate a critical value for the test statistic. Model update module 328 may trigger hypothesis testing module 324 to perform a statistical hypothesis test and to output a determination whether the null hypothesis is rejected. In various embodiments, model update module 328 may automatically refit the equipment model with a new set of model coefficients (e.g., in response to a determination that the null hypothesis is rejected) or conditionally refit the equipment model with the new set of model coefficients (e.g., refit only if the new set of model coefficients is a better fit than the previous set of model coefficients).

Figure 4:
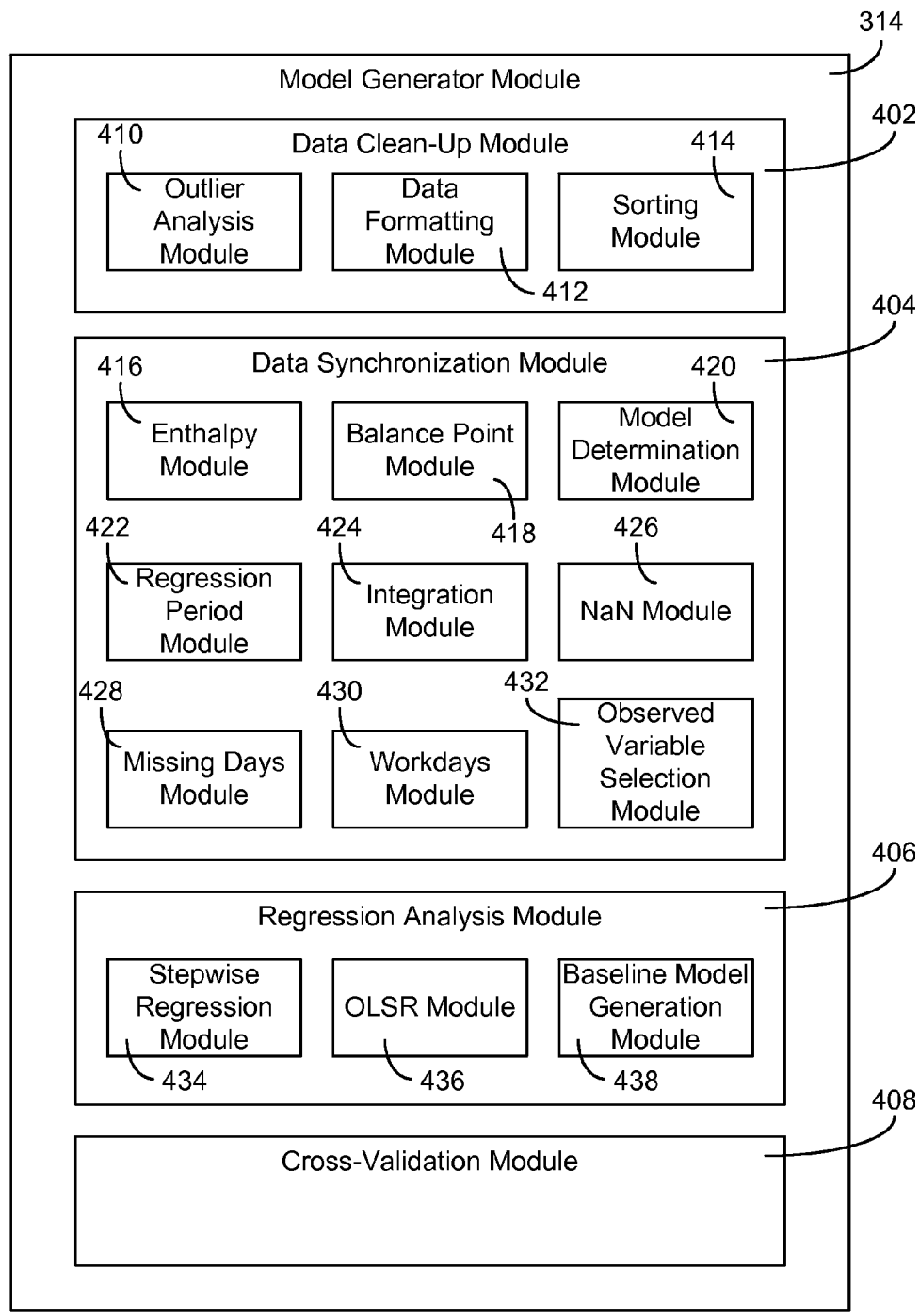
FIG. 4 is a block diagram illustrating a model generator module of the equipment model adaptation system of FIG. 3 in greater detail, according to an exemplary embodiment.

Referring now to FIG. 4, model generator module 314 is shown in greater detail, according to an exemplary embodiment. Model generator module 314 is shown to include a data clean-up module 402. Data clean-up module 402 may be configured to receive operating data from BAS database and/or building subsystems 228 and pre-filter the data for data synchronization module 404 and the other modules of model generator module 314. Data clean-up module 402 may include an outlier analysis module 410, a data formatting module 412, and a sorting module 414 for pre-filtering the data. Data clean-up module 402 may use sub-modules 410-414 to discard or format bad data by normalizing any formatting inconsistencies with the data, removing statistical outliers, or otherwise preparing the data for further processing. Data formatting module 412 may be configured to ensure that like data is in the same correct format (e.g., all time-based variables are in the same terms of hours, days, minutes, etc.). Sorting module 414 may be configured to sort data for further analysis (e.g., place in chronological order, apply timestamps, etc.).

Outlier analysis module 410 may be configured to test data points and determine if a data point is reliable. For example, if a data point is more than a threshold (e.g., three standard deviations, four standard deviations, or another set value) away from the an expected value (e.g., the mean) of all of the data points, the data point may be determined as unreliable and discarded. Outlier analysis module 410 may further calculate the expected value of the data points that each data point is to be tested against. Outlier analysis module 410 may be configured to replace the discarded data points in the data set with a NaN or another flag such that the new value will be skipped in further data analysis.

According to another exemplary embodiment, outlier analysis module 410 can be configured to conduct a cluster analysis. The cluster analysis may be used to help identify and remove unreliable data points. For example, a cluster analysis may identify or group operating states of equipment (e.g., identifying the group of equipment that is off). A cluster analysis can return clusters and centroid values for the grouped or identified equipment or states. The centroid values can be associated with data that is desirable to keep rather than discard. Cluster analyses can be used to further automate the data clean-up process because little to no configuration is required relative to thresholding.

Data clean-up module 402 may further include any other pre-filtering tasks for sorting and formatting the data for use by model generator module 314. For example, data clean-up module 402 may include an integrator or averager which may be configured to smooth noisy data (e.g., a varying number of occupants in a building area). The integrator or averager may be used to smooth data over a desired interval (e.g., a 15 minute average, hourly average, etc.).

Still referring to FIG. 4, model generator module 314 is shown to include a data synchronization module 404. Data synchronization module 404 may be configured to select a possible set of variables estimated to be significant to energy usage in the building. In some embodiments, data synchronization module 404 selects the possible set of variables (e.g., a preliminary set of variables) that are provided to stepwise regression module 434 for selection of the actual set of variables to use to generate the equipment model. According to various exemplary embodiments, the selection of some or all of the set of variables to use for equipment model generation may occur in data synchronization module 404, stepwise regression analysis 434, or a combination of both. Data synchronization module 404 may include sub-modules for calculating predictor variables and selecting one or more of the predicted variables to include in the possible set of variables. Data synchronization module 404 may further include sub-modules for selecting observed (e.g., measured) data points for the set of variables.

According to one exemplary embodiment, data synchronization module 404 is configured to calculate degree days and energy days (e.g., a predictor variable associated with heating or cooling of a building) and determine which of these predictors should be used to yield a better baseline model. The outputs of data synchronization module 404 (e.g., inputs provided to regression analysis module 406) may include the measurements or predictor variables to use, a period of time associated with the measurements or predictor variables, and errors associated with the data included in the measurements or predictor variables.

Data synchronization module 404 is shown to include an enthalpy module 416, a balance point module 418, a model determination module 420, a regression period module 422, an integration module 424, a NaN module 426, a missing days module 428, a workdays module 430, and an observed variable selection module 432. Enthalpy module 416 may be configured to calculate an enthalpy given a temperature variable and a humidity variable. Enthalpy module 416 may combine an outdoor temperature variable and an outside air humidity variable via a nonlinear transformation or another mathematical function into a single variable. The single variable may then be used by model generator module 314 as a better predictor of a building's energy use than using both temperature and humidity values separately.

Balance point module 418 may be configured to find an optimal balance point for a calculated variable (e.g., a variable based on an enthalpy value calculated in enthalpy module 416, an outdoor air temperature variable, etc.). Balance point module 418 may determine a base value for the variable for which the estimated variance of the regression errors is minimized. Model determination module 420 may be configured to determine a type of baseline model to use for measuring and verifying energy savings. The determination may be made based on an optimal balance point generated by balance point module 418.

Regression period module 422 may be configured to determine periods of time that can be reliably used for model regression by model generator module 314 and data synchronization module 404. In some embodiments, regression period module 422 uses sliding data windows to identify a plurality of data samples for use in a regression analysis. For example, regression period module 422 may define regression periods $T_1$ and $T_2$ and identify a plurality of data samples within each regression period. In some embodiments, regression period module 422 defines regression period $T_2$ as a fixed-duration time window (e.g., one month, one week, one day, one year, one hour, etc.) ending at the current time. Regression period module 422 may define regression period $T_1$ as a fixed-duration time window occurring at least partially prior to regression period $T_2$ (e.g., ending at the beginning of regression period $T_2$, ending within regression period $T_2$, etc.). As time progresses, regression period module 422 may iteratively redefine regression periods $T_1$ and $T_2$ based on the current time at which the regression is performed. Sliding data windows are described in greater detail with reference to FIG. 5.

Regression period module 422 may identify period start dates and end dates associated with calculated and measured variables for the data synchronization. Regression period module 422 may determine the start date and end date corresponding with the variable with the longest time interval (e.g., the variable for which the most data is available). For example, regression period module 422 may determine the period by finding the period of time which is covered by all variables, and providing the start date and end date of the intersection to data synchronization module 404. Regression period module 422 may be further configured to identify data within the periods that may be erroneous or cannot be properly synchronized.

Integration module 424 may be configured to perform an integration over a variable structure from a given start and end time period (e.g., a time period from regression period module 422). According to an exemplary embodiment, integration module 424 uses a trapezoidal method of integration. Integration module 424 may receive an input from balance point module 418 or another module of data synchronization module 404 for performing an integration for a balance point determined by balance point module 418. NaN module 426 may be configured to identify NaN flags in a variable structure. NaN module 426 may be further configured to replace the NaN flags in the variable structure via interpolation. NaN module 426 may receive an input from, for example, data clean-up module 402, and may be configured to convert the outlier variables and NaNs determined in module 402 into usable data points via interpolation.

Missing days module 428 may be configured to determine days for which is there is not enough data for proper integration performance. Missing days module 428 may compare the amount of data for a variable for a given day (or other period of time) and compares the amount to a threshold (e.g., a fraction of a day) to make sure there is enough data to accurately calculate the integral. Workdays module 430 may be configured to determine the number of work days in a given interval based on the start date and end date of the interval. For example, for a given start date and end date, workdays module 430 can determine weekend days and holidays that should not figure into the count of number of work days in a given interval. Modules 428, 430 may be used by data synchronization module 404 to, for example, identify the number of days within a time interval for which there exists sufficient data, identify days for which data should not be included in the calculation of the baseline model, etc.

Observed variable selection module 432 may be configured to receive observed or measured data from the BMS and determine which observed data should be used to generate equipment models 316 based on the selection of calculated data in modules 418-420. For example, when balance point module 418 determines a calculated variable, observed variable selection module 432 may be configured to determine if there is enough predictor variable data for the observed variable. According to an exemplary embodiment, the predictor variable data and observed variable data for a specific variable (e.g., temperature) may only be used when sufficient predictor variable data (e.g., degree days) for the observed variable data exists. For example, if the predictor variable data is available over a specified range (e.g., 20 days, 2 months, or any other length of time), then module 432 may determine there is enough predictor variable data such that the predictor variable data and observed variable data can be used for baseline model generation.

Still referring to FIG. 4, model generator module 314 is shown to include a regression analysis module 406. Regression analysis module 406 may be configured to generate model coefficients for equipment models 316 using an ordinary least squares regression (OLSR) method or any other regression technique. Regression analysis module 406 is shown to include a baseline model generation module 438 for generating the baseline model and an OLSR module 436 for receiving data from data synchronization module 404, applying the data to a OLSR method, and providing baseline model generation module 438 with a set of regression coefficients.

Baseline model generation module 438 may be configured to generate the baseline model. Baseline model generation module 438 may be configured to use OLSR module 436 to perform OLSR of the data and stepwise regression module 434 to determine the predictor variables for the baseline model and to eliminate insignificant variables. Module 438 may be configured to provide, as an output, baseline equipment models and may be configured to calculate various statistics for further analysis of the baseline model (e.g., computing the number of independent observations of data in the data set used, computing the uncertainty of the model, etc.).

Regression analysis module 406 is further shown to include stepwise regression module 434. Stepwise regression module 434 may be configured to perform stepwise linear regression in order to eliminate statistically insignificant predictor variables from an initial set of variables selected by data synchronization module 404. In other words, stepwise regression module 434 uses stepwise regression to add or remove predictor variables from a data set (e.g., the data set from data synchronization module 404) for further analysis.

Stepwise regression module 434 may be configured to add or remove predictor variables from a set for further analysis in a systematic way. At each step, module 434 may conduct statistical hypothesis testing (e.g., by computing a probability of obtaining a test statistic used to describe the similarity between data values) to determine if the variable should be added or removed. For example, for a particular variable, if the variable would have a zero (or near zero) coefficient if it were in the baseline equipment model, then the variable may be removed from consideration for the baseline equipment model. According to various alternative embodiments, other approaches to stepwise regression are used (e.g., factorial designs, principal component analysis, etc.).

OLSR module 436 may be configured to receive a subset of the variables from data synchronization module 404 which has been selected by stepwise regression module 434, and to compute an ordinary least squares regression of the variables in order to generate a baseline model. According to various alternative embodiments, other methods (e.g., a principal component regression (PCR), ridge regression (RR), partial least squares regression (PLSR)) are also or alternatively used in the baseline model calculation instead of an OLSR method.

Still referring to FIG. 4, model generator module 314 is further shown to include a cross-validation module 408. Cross-validation module 408 may be configured to validate the baseline model generated by regression analysis module 406 (e.g., validating that there is no overfitting of the model, validating that the order and number of variables in the model is correct, etc.) by applying data for a test period of time (in the past) to the model and determining whether the model provides a good estimate of energy usage.

Cross-validation of the baseline model may be used to verify that the model will fit or adequately describe varying data sets from the building. According to one exemplary embodiment, cross-validation module 408 may use a K-fold cross-validation method. The K-fold cross validation method is configured to randomly partition the historical data provided to model generator module 314 into K number of subsamples for testing against the baseline model. In other embodiments, a repeated random sub-sampling process (RRSS), a leave-one-out (LOO) process, a combination thereof, or another suitable cross-validation routine may be used by cross-validation module 408.

In some embodiments, cross-validation module 408 is used to quantify a fit of a set of model coefficients. Cross-validation module 408 may determine whether a new set of model coefficients fits an equipment model better than a previous set of model coefficients based on one or more sets of operating data. Cross-validation module 408 may output a result of the determination to model update module 328, which may be configured to update the model coefficients in equipment models 316 only if the new set of model coefficients is a better fit.

Figure 5:
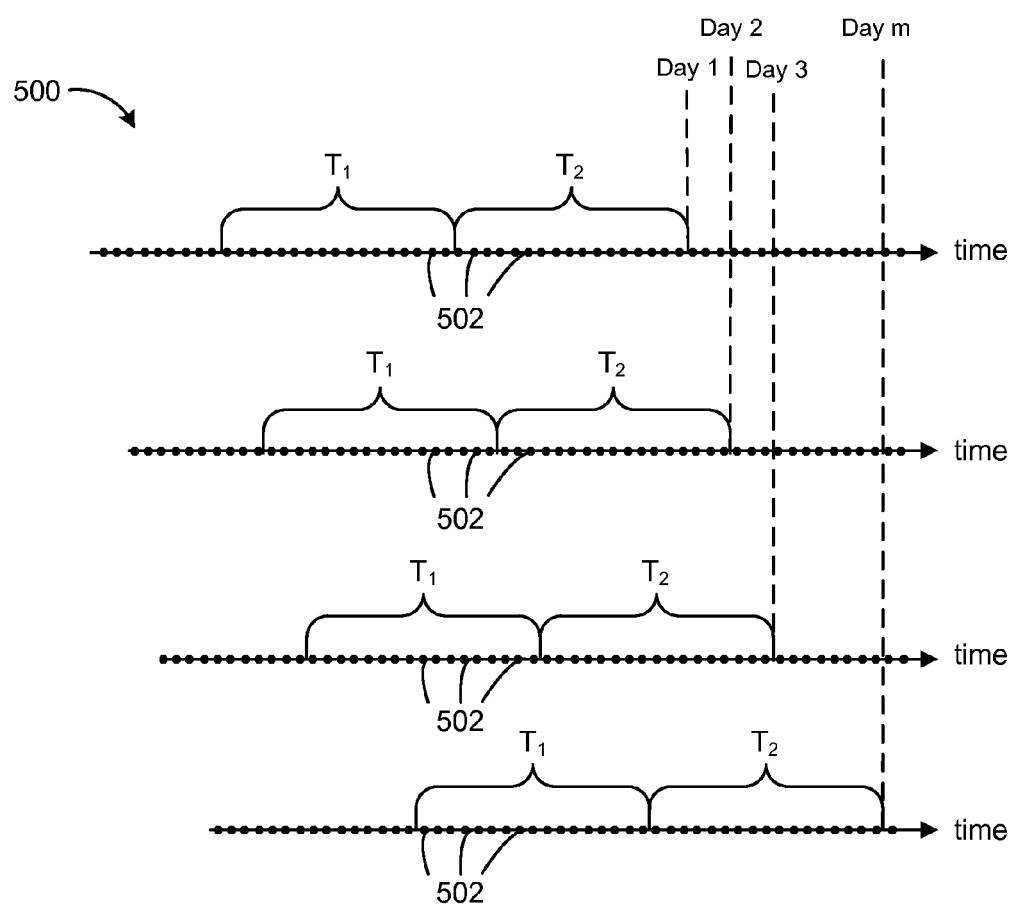
FIG. 5 is a drawing of a timeline illustrating sliding data windows that may be used by the equipment model adaptation system of FIG. 3 to iteratively define data sets, according to an exemplary embodiment.

Referring now to FIG. 5, a timeline 500 illustrating sliding data windows that may be used by BAS controller 202 and/or system 300 are shown, according to an exemplary embodiment. Timeline 500 is shown to include a plurality of data samples 502, represented by dots on timeline 500. Data samples 502 include the operating data collected by operating data aggregator 310 and stored in BAS database 312. Each of data samples 502 may include any number of data points at a particular time step i. For example, each data sample 502 may include values for one or more independent variables $x_{i1}, \ldots x_{ip}$ and/or one or more dependent variables $y_{i1}, \ldots y_{ip}$ in equipment models 316 at a particular time step i, where i=1 . . . n, n is the total number of data samples 502, and p is the total number of data points in each data sample 502. Data samples 502 may be received from building subsystems 228 (e.g., from sensors, from local controllers, from equipment, etc.), retrieved from memory 308, provided by an external system or device (e.g., control setpoints provided by a client device or supervisory controller, etc.), and/or calculated based various data inputs. Data samples 502 may be stored in BAS database 312 and retrieved by operating data aggregator 310 for use in generating model coefficients β, as described with reference to FIGS. 2-4.

Timeline 500 is shown to include data windows $T_1$ and $T_2$. Data windows $T_1$ and $T_2$ define sets of data samples 502 that are used by model generator module 314 to generate model coefficients β. For example, model generator module 314 may perform a first regression analysis using the data samples 502 within data window $T_1$ to generate the first set of model coefficients $\beta_1$. Model generator module 314 may perform a second regression analysis using the data samples 502 within data window $T_2$ to generate the second set of model coefficients $\beta_2$. Data windows $T_1$ and $T_2$ may be defined by regression period module 422, as described with reference to FIG. 4.

In some embodiments, data windows $T_1$ and $T_2$ are fixed-duration windows having start times and end times based on the current time. For example, in timeline 500, the end time of data window $T_2$ is shown as the current time. As time progresses (e.g., from Day 1, to Day 2, to Day 3, . . . , to Day m), the end time of data window $T_2$ may be iteratively updated (i.e., sliding forward in time) to match the current time. The start time of data window $T_2$ may be a predetermined duration (e.g., one month, one week, one year, one day, etc.) prior to the end time of data window $T_2$. As time progresses, the start time of data window $T_2$ may also slide forward in time to maintain the fixed duration of the data window. In some embodiments, data window $T_1$ is also a fixed-duration window having a start time prior to the start time of data window $T_2$. As shown in FIG. 5, data window $T_1$ may have an end time that coincides with or is immediately prior to the start time of data window $T_2$. In other embodiments, data window $T_1$ may have an end time that occurs within data window $T_2$ such that data windows $T_1$ and $T_2$ partially overlap. Data window $T_1$ may also slide forward in time as time progresses.

Sliding data windows $T_1$ and $T_2$ forward in time changes the set of data samples 502 within each data window. In some embodiments, model generator module 314 iteratively determines the model coefficients $\beta_1$ and $\beta_2$ using updated sets of data samples 502 as data windows $T_1$ and $T_2$ move forward in time. With each iteration of the model coefficients $\beta_1$ and $\beta_2$, an updated test statistic $F_{\Delta\beta}$ may be generated by test statistic module 320 and compared with a critical value $f_{crit}$ by hypothesis testing module 324.

In some embodiments, data window $T_1$ does not move forward in time along with data window $T_2$, but rather defines a fixed set of data samples 502 upon which the model coefficients $\beta_1$ in an existing equipment model are based. Data window $T_2$ may slide forward in time to iteratively redefine a new set of data samples 502 that are used by model generator module 314 to generate a new set of model coefficients $\beta_2$. By maintaining data window $T_1$ at the set of data samples 502 used to generate the model coefficients $\beta_1$ in the current equipment model, the statistical hypothesis test performed by hypothesis testing module 324 can determine whether the model coefficients $\beta_1$ currently used in the equipment model are significantly different from the iteratively-updated values $\beta_2$. When the null hypothesis is rejected, a new set of model coefficients may be applied to the equipment model by model update module 328. Upon updating the equipment model, data window $T_1$ may be moved forward in time to encompass the data samples 502 used to generate the new model coefficients applied to the equipment model.

Figure 6:
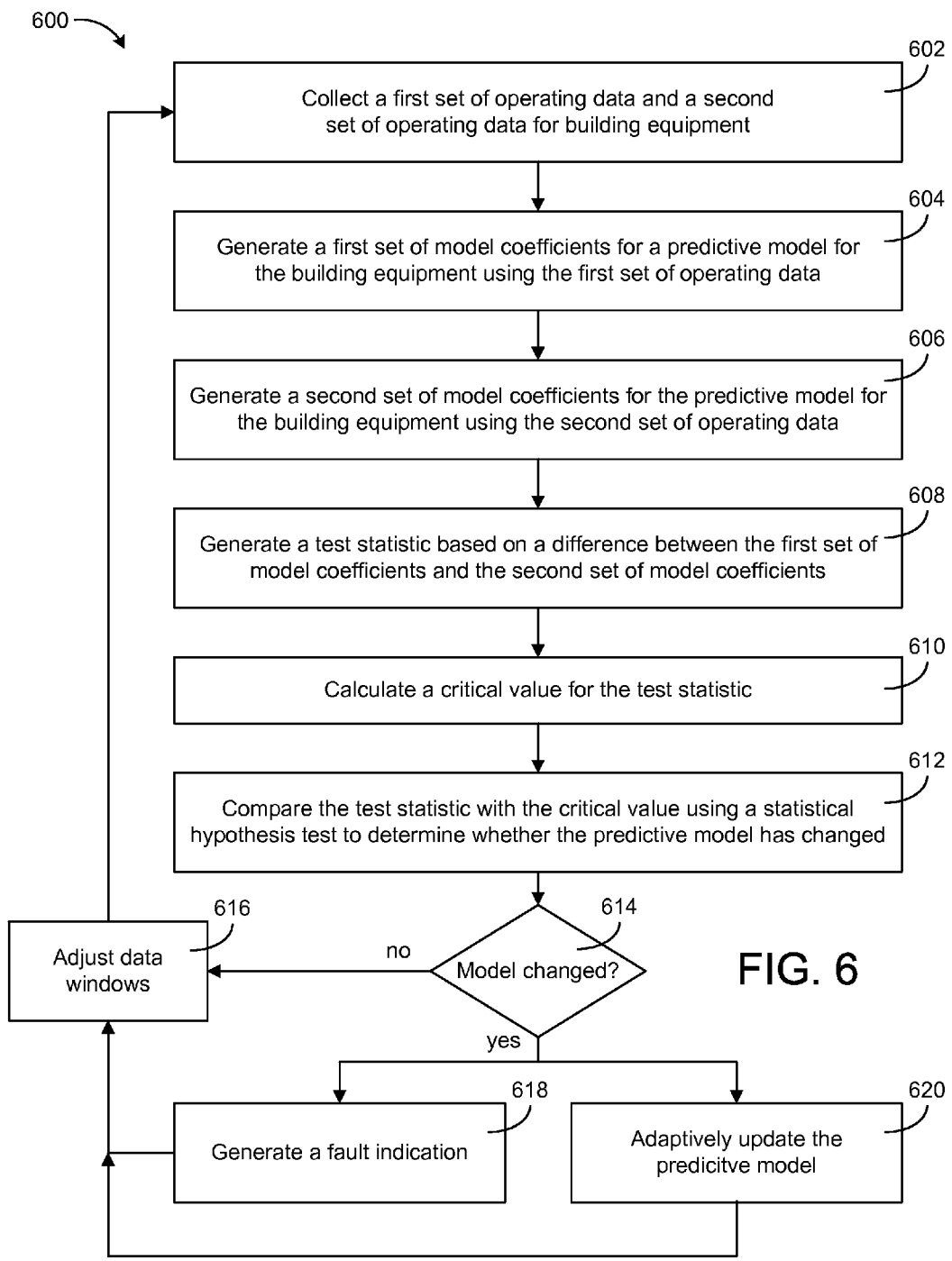
FIG. 6 is a flowchart of a process for identifying changes in a predictive model for building equipment, according to an exemplary embodiment.

Referring now to FIG. 6, a flowchart of a process 600 for identifying changes in a predictive model for building equipment is shown, according to an exemplary embodiment. In some embodiments, process 600 is performed by BAS controller 202 and/or equipment model adaptation system 300, as described with reference to FIGS. 2-3. Process 600 may be used to determine, via statistical hypothesis testing, whether a predictive model for building equipment has changed.

The predictive model may be one of equipment models 316, as described with reference to FIG. 3. For example, the predictive model may be a mathematical model having one or more independent variables x and one or more dependent variables y. In some embodiments, the predictive model is of the form:

$$y = \beta_0 + \beta_1 x_1 + \beta_2 x_2 + \ldots + \beta_p x_p + \epsilon$$

where y is the dependent variable predicted by the model (e.g., a performance metric such as power consumption, operating efficiency, etc.), $x_1 \ldots x_p$ are the independent variables (e.g., predictor variable such as device load), the $\beta$ parameters are the model coefficients, and $\epsilon$ is the error between the actual value of y and a model predicted value. The predictive model may be used by BAS controller 202 in a model-based control strategy to predict the performance of the building equipment. In various embodiments, the building equipment may be a single device, a collection of devices, a building subsystem, a subplant, or any other set of one or more devices for which a variable of interest can be predicted or estimated via a predictive model.

Still referring to FIG. 6, process 600 is shown to include collecting a first set of operating data and a second set of operating data for the building equipment (step 602). Operating data may include, for example, measured or calculated values for the independent and dependent variables in the predictive model. Values for the operating data may be measured by sensors, derived from measured values, and/or calculated by various components of BAS 200 or system 300 based on the actual operation of building subsystems 228 during the first and second time periods.

The first set of operating data may correspond to a first time period $T_1$ and the second set of operating data may correspond to a second time period $T_2$. Step 602 may include organizing the operating data into the first set and the second set using timestamps associated with various data points of the operating data. For example, any data point that has a timestamp within the first time period $T_1$ may be assigned to the first set of operating data, whereas any data point that has a timestamp within the second time period $T_2$ may be assigned to the second set of operating data. In some embodiments, step 602 includes defining the first time period $T_1$ and the second time period $T_2$, as described with reference to FIG. 5.

Step 602 may include collecting the operating data from building subsystems 228, storing the operating data in BAS database 312, and/or retrieving the operating data from BAS database 312. In some embodiments, step 602 includes one or more of the data clean-up operations described with reference to data clean-up module 402 (e.g., outlier analysis, data formatting, sorting, data scrubbing, steady state filtering, etc.). In some embodiments, step 602 includes one or more of the data synchronization operations described with reference to data synchronization module 404 (e.g., determining a balance point, determining an appropriate parameter order for the predictive model, selecting predictor variables to include in the predictive model, identifying data that is not a number, identifying missing days, identifying workdays, etc.).

Still referring to FIG. 6, process 600 is shown to include generating a first set of model coefficients for the predictive model using the first set of operating data (step 604) and generating a second set of model coefficients for the predictive model using the second set of operating data (step 606). Steps 604-606 may be performed as separate regression processes based on different sets of operating data. For example, step 604 may include using the first set of operating data to generate a first set of model coefficients $\hat{\beta}_1$ corresponding to the first time period $T_1$. Step 606 may include using the second set of operating data to generate a second set of model coefficients $\hat{\beta}_2$ corresponding to the second time period $T_2$.

In some embodiments, steps 604-606 are performed by model generator module 314, as described with reference to FIGS. 3-4. For example, steps 604-606 may include generating an estimate $\hat{\beta}$ for the model coefficients $\beta$ that minimizes a function of the model error $\epsilon$. In some embodiments, steps 604-606 include generating the estimated model coefficients $\hat{\beta}$ using a residual sum of squares (RSS) function as defined in the following equation:

$$RSS(\beta) = \Sigma(y_i - x_i\beta)^2 = (Y - X\beta)^T(Y - X\beta)$$

Steps 604-606 may include generating an ordinary least squares (OLS) estimate of the model coefficients $\hat{\beta}$ by finding the model coefficient vector $\beta$ that minimizes the RSS function. Steps 604-606 may include finding the vector $\hat{\beta}$ that minimizes the RSS function using the following equation:

$$\hat{\beta} = (X^T X)^{-1} X^T Y$$

According to various exemplary embodiments, other methods than RSS and/or OLS may be used (e.g., weighted linear regression, regression through the origin, a principal component regression (PCR), ridge regression (RR), partial least squares regression (PLSR), etc.) to generate the model coefficients.

Still referring to FIG. 6, process 600 is shown to include generating a test statistic based on a difference between the first set of model coefficients and the second set of model coefficients (step 608). In some embodiments, step 608 is performed by test statistic module 320, as described with reference to FIG. 3. The difference $\Delta\beta$ between the first set of model coefficients $\hat{\beta}_1$ and the second set of model coefficients $\hat{\beta}_2$ may be a normally distributed random vector as shown in the following equation:

$$\Delta\beta=(\hat{\beta}_1-\hat{\beta}_2)\sim N(0,\sigma^2[(X_1^T X_1)^{-1}+(X_2^T X_2)^{-1}])$$

where $\Delta\beta$ is the change in model coefficients between time periods $T_1$ and $T_2$ (e.g., $\Delta\beta=(\hat{\beta}_1-\hat{\beta}_2)$) and $X_1$ and $X_2$ are matrices of the independent variable samples in time periods $T_1$ and $T_2$, respectively.

Step 608 may include calculating the test statistic using the following equation:

$$F_{\Delta\beta}=\left(\frac{\Delta\beta^T[(X_1^T X_1)+(X_2^T X_2)^{-1}]^{-1}\Delta\beta}{RSS_1+RSS_2}\right)\left(\frac{n_1+n_2-2p}{p}\right)\sim F_{p,n_1+n_2-2p}$$

where $n_1$ and $n_2$ are the number of data points used to estimate the model coefficients $\hat{\beta}_1$ and $\hat{\beta}_2$, respectively (equal to the number of rows in $X_1$ and $X_2$), p is the number of independent variables (equal to the number of columns in $X_1$ and $X_2$), $RSS_1$ and $RSS_2$ are the residual sums of squares for model coefficients $\hat{\beta}_1$ and $\hat{\beta}_2$, respectively, and $F_{\Delta\beta}$ is the test statistic.

In some embodiments, the test statistic $F_{\Delta\beta}$ is an F-distributed random variable. As $\Delta\beta$ moves away from the origin, $F_{\Delta\beta}$ increases. The maximum increase may occur in the direction of the least variance of the model coefficients and may be scaled by the sum of squared errors. Thus, $F_{\Delta\beta}$ may be based on changes in model coefficients which can easily be related back to actual changes in the equipment. The test statistic $F_{\Delta\beta}$ also considers random variation of the changes of the model coefficients even when the model is stationary. In some embodiments, step 608 includes converting the test statistic $F_{\Delta\beta}$ into a standard normal variable $Z_{\Delta\beta}$ using a transformation function. In various embodiments, either $F_{\Delta\beta}$ or $Z_{\Delta\beta}$ may be used as the test statistic.

Still referring to FIG. 6, process 600 is shown to include calculating a critical value for the test statistic (step 610) and comparing the test statistic with the critical value using a statistical hypothesis test to determine whether the predictive model has changed (step 612). In some embodiments, steps 610 and 612 are performed by critical value module 322 and hypothesis testing module 324, respectively, as described with reference to FIG. 3. In step 612, the critical value $f_{crit}$ may be compared with the test statistic $F_{\Delta\beta}$ using a statistical hypothesis test to determine whether a change in the model coefficients $\Delta\beta$ is statistically significant. For example, step 612 may include formulating a null hypothesis that the model coefficients $\Delta\beta$ have not changed and rejecting the null hypothesis in response to a determination that the test statistic $F_{\Delta\beta}$ exceeds the critical value $f_{crit}$.

In some embodiments, step 610 includes generating the critical value $f_{crit}$ using an inverse cumulative distribution function for the test statistic $F_{\Delta\beta}$. For example, step 610 may include calculating the critical value $f_{crit}$ using the following equation:

$$f_{crit}=F_{p+1,n_1+n_2-2(p+1)}^{-1}(1-\alpha)$$

where $F^{-1}$ is the inverse cumulative distribution function for the test statistic and the parameter $\alpha$ represents the probability of a false positive (i.e., incorrectly rejecting the null hypothesis when in fact the model coefficients have not changed) for the statistical hypothesis test performed in step 612. Step 610 may include determining the parameter $\alpha$ by identifying an acceptable probability that the null hypothesis will be incorrectly rejected. In various embodiments, a value for the parameter $\alpha$ may be retrieved from memory, specified by a user, and/or calculated based on one or more stored values.

Step 610 may include using the parameter $\alpha$ as an input to the inverse cumulative distribution function $F^{-1}$ to determine, based on the parameter $\alpha$, the critical value $f_{crit}$ such that the test statistic $F_{\Delta\beta}$ has a predetermined likelihood of exceeding the critical value $f_{crit}$ when the predictive model has not changed. The predetermined likelihood may be the same as the acceptable probability that the null hypothesis will be incorrectly rejected. The critical value $f_{crit}$ output by the inverse cumulative distribution function $F^{-1}$ may be greater than $(1-\alpha)\%$ of values for the test statistic $F_{\Delta\beta}$ when the null hypothesis is valid. For example, if a value of $\alpha=0.05$ is provided as an input to the inverse cumulative distribution function, the corresponding value for $f_{crit}$ will be greater than $(1-0.05)=0.95$ or 95% of values for the test statistic $F_{\Delta\beta}$ when the null hypothesis is valid.

Step 612 may include comparing the critical value $f_{crit}$ with the test statistic $F_{\Delta\beta}$ to determine whether to reject the null hypothesis that the predictive model has not changed. If the value of the test statistic is greater than the critical value (i.e., $F_{\Delta\beta} > f_{crit}$), step 612 may include rejecting the null hypothesis. The value for the parameter $\alpha$ defines a statistical confidence $(1-\alpha)$ that the null hypothesis is properly rejected when $f_{crit} > F_{\Delta\beta}$. Thus, step 612 may include determining with $(1-\alpha)\%$ confidence that the predictive model has changed when the test statistic is greater than the critical value. If the value of the test statistic is not larger than the critical value (i.e., $F_{\Delta\beta} \leq f_{crit}$), step 612 may include failing to reject the null hypothesis and determining that the predictive model has not changed.

Still referring to FIG. 6, process 600 is shown to include determining whether the predictive model has changed (step 614). Step 614 may include determining that the predictive model has changed in response to rejecting the null hypothesis in step 612. In some embodiments, step 614 includes identifying a statistical confidence (e.g., $1-\alpha$) with which the null hypothesis is rejected. The statistical confidence may represent a likelihood that the predictive model has in fact changed when the null hypothesis is rejected. Step 614 may include determining that the predictive model has not changed in response to failing to reject the null hypothesis in step 612.

In response to a positive determination in step 614 (i.e., a determination that the predictive model has changed), process 600 may proceed to generating a fault indication (step 618) and/or adaptively updating the predictive model (step 620). In some embodiments, steps 618 and 620 are performed by fault detection module 326 and model update module 328, respectively, as described with reference to FIG. 3. Steps 618-620 are shown occurring in parallel in FIG. 6. However, it is not necessary that both steps 618-620 are performed. In various embodiments, process 600 may include performing both steps 618-620 or omitting one or both of steps 618-620.

Step 618 may include determining that a fault is detected in response to a determination that the predictive model has changed. In some embodiments, a detected fault indicates that the equipment is optimizing inefficiently (e.g., due to the predictive model no longer accurately predicting the performance of the equipment) and/or that the equipment model can be updated to better optimize the performance of the equipment. In some embodiments, a detected fault indicates that the equipment is controlling poorly (e.g., due to a physical change or defect in the equipment itself) and may be in need of repair or replacement.

Step 618 may include automatically diagnosing and responding to detected faults. The responses to detected or diagnosed faults may include providing an alert message to a user, a maintenance scheduling system, or a control algorithm configured to attempt to repair the fault or to work-around the fault. In some embodiments, step 618 includes providing "fault" events to various components of system 300, BAS controller 202 (e.g., to integrated control layer 218 which can execute control strategies and policies in response to the received fault events) and/or to an external system or device (e.g., a client device, a user terminal, etc.). Step 618 may include reporting a detected fault and a statistical confidence with which the fault is detected. The statistical confidence may be a function of the a parameter (e.g., $1-\alpha$) used to reject the null hypothesis. The statistical confidence may be appended to the fault event and communicated along with the fault event.

Step 620 may include adaptively updating the predictive model in response to the determination in step 614 that the predictive model has changed. Step 620 may include refitting the predictive model with a new set of model coefficients. In some embodiments, the new set of model coefficients are generated using new operating data (e.g., new variables, new values for existing variables, etc.) gathered in response to a determination that the predictive model has changed. In other embodiments, the new set of model coefficients are generated prior to the determination. For example, step 620 may include using the set of model coefficients $\hat{\beta}_2$ generated in step 606 as the new set of model coefficients (i.e., without performing an additional refit).

In some embodiments, step 620 include automatically applying the new set of model coefficients to the predictive equipment model whenever the determination in step 614 indicates that the predictive model has changed. In other embodiments, step 620 includes determining whether the new set of model coefficients is a better fit than a previous set of model coefficients that would be replaced by the new set of model coefficients. For example, step 620 may include calculating a coefficient of variation of the root mean square error (CVRMSE) or any other metric that quantifies how well each set of model coefficients fits the equipment model. Step 620 may include determining that the fit is improved when the new CVRMSE value is less than the previous CVRMSE value (e.g., $CVRMSE_2 < CVRMSE_1$).

In some embodiments, step 620 includes applying the new set of model coefficients to the predictive model only if the new set of model coefficients is a better fit than the previous set of model coefficients. If the new set of model coefficients is not a better fit than the previous set of model coefficients (e.g., $CVRMSE_2 \geq CVRMSE_1$), step 620 may include discarding the new set of model coefficients and retaining the previous set of model coefficients in the predictive model.

Still referring to FIG. 6, process 600 is shown to include adjusting the data windows used to define the first set of operating data and the second set of operating data (step 616). Step 616 may be performed in response to a negative determination in step 614 (i.e., a determination that the predictive model has not changed) and/or following steps 618-620. Adjusting the data windows may include iteratively redefining the time periods $T_1$ and/or $T_2$ as time progresses.

In some embodiments, the time periods $T_1$ and $T_2$ are fixed-duration periods having start times and end times based on the current time. For example, the end time of time period $T_2$ may be the current time. As time progresses (e.g., from Day 1, to Day 2, to Day 3, . . . , to Day m), the end time of the second time period $T_2$ may be iteratively updated (i.e., sliding forward in time) to match the current time. The start time of the second time period $T_2$ may be a predetermined duration (e.g., one month, one week, one year, one day, etc.) prior to the end time of the second time period $T_2$. As time progresses, the start time of time period $T_2$ may also slide forward in time to maintain the fixed duration of the time period. In some embodiments, time period $T_1$ is also a fixed-duration time period having a start time prior to the start time of time period $T_2$. Time period $T_1$ may have an end time that coincides with or is immediately prior to the start time of time period $T_2$. In other embodiments, time period $T_1$ may have an end time that occurs within time period $T_2$ such that time periods $T_1$ and $T_2$ partially overlap. Time period $T_1$ may also slide forward in time as time progresses.

In some embodiments, time period $T_1$ does not move forward in time along with time period $T_2$, but rather defines a fixed set of data samples upon which the model coefficients $\beta_1$ in an existing equipment model are based. Time period $T_2$ may slide forward in time to iteratively redefine a new set of data samples that are used in step 606 to generate the second set of model coefficients $\beta_2$. By maintaining time period $T_1$ at the set of data samples used to generate the model coefficients $\beta_1$ in the current equipment model, the statistical hypothesis test performed in step 612 can determine whether the model coefficients $\beta_1$ currently used in the equipment model are significantly different from the iteratively-updated values $\beta_2$. When the null hypothesis is rejected, a new set of model coefficients may be applied to the equipment model in step 620. Upon updating the equipment model, time period $T_1$ may be moved forward in time to encompass the data samples used to generate the new model coefficients applied to the equipment model.

After adjusting the data windows in step 616, process 600 may return to step 602. Process 600 may be repeated iteratively (e.g., on a periodic basis, on demand, etc.). With each iteration, steps 602-620 may be performed. Sliding time periods $T_1$ and $T_2$ forward in time changes the set of data samples within each time period. Accordingly, each iteration of process 600 may collect different sets of operating data in step 602 and use the different sets of operating data to generate the model coefficients $\beta_1$ and $\beta_2$.

Figure 7:
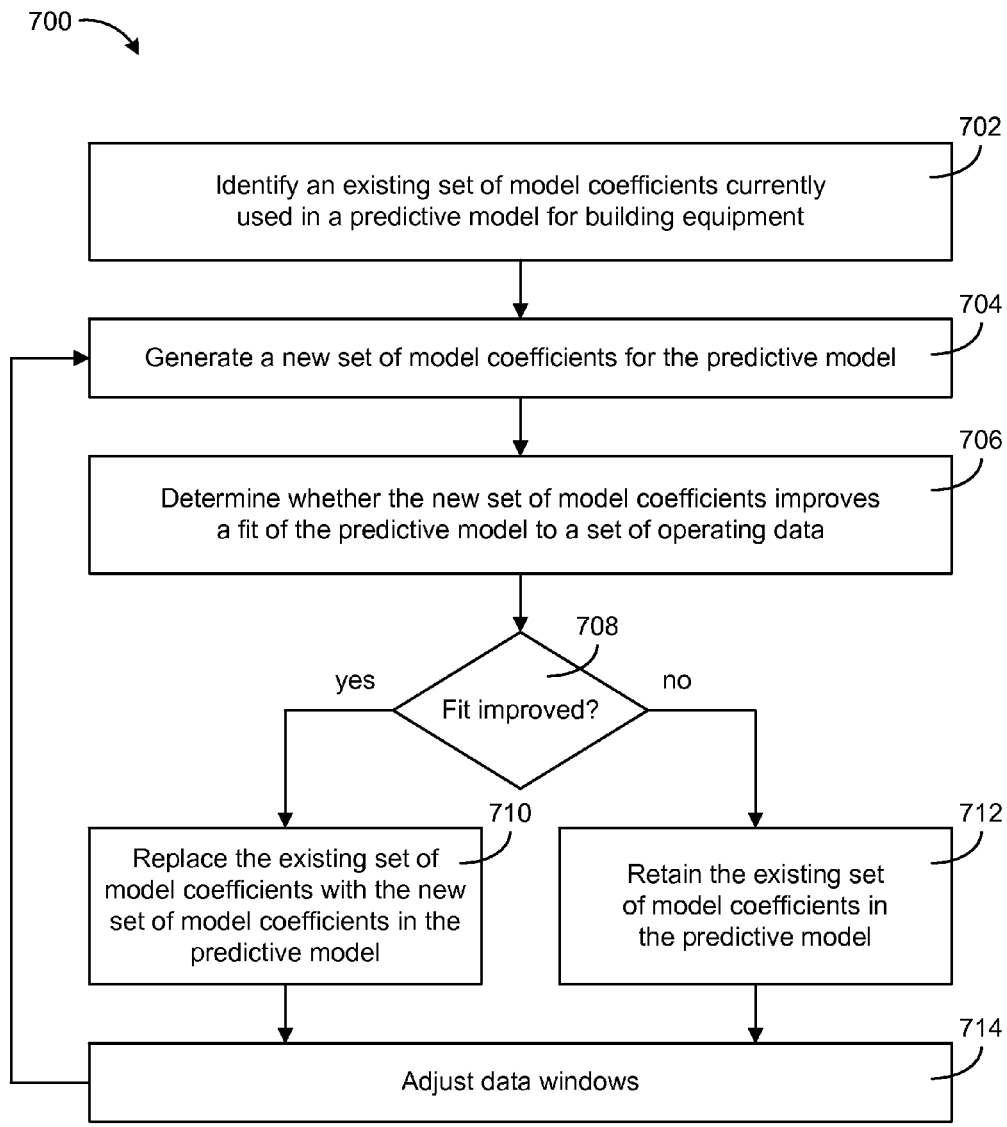
FIG. 7 is a flowchart of a process for adaptively updating an equipment model with a new set of model coefficients, according to an exemplary embodiment.

Referring now to FIG. 7, a flowchart of a process 700 for adaptively updating an equipment model with a new set of model coefficients is shown, according to an exemplary embodiment. In some embodiments, process 700 is performed by BAS controller 202 and/or equipment model adaptation system 300, as described with reference to FIGS. 2-3. Process 700 may be used to accomplish step 620 of process 600 (i.e., adaptively updating a predictive model).

Process 700 is shown to include identifying an existing set of model coefficients currently used in a predictive model for building equipment (step 702). The existing set of model coefficients may be identified by accessing a stored predictive model and retrieving the model coefficients. In some embodiments, the existing set of model coefficients are a first set of model coefficients $\beta_1$ generated using operating data corresponding to a first time period $T_1$. For example, the existing set of model coefficients $\beta_1$ may be generated in step 604 of process 600.

Process 700 is shown to include generating a new set of model coefficients for the predictive model (step 704). In some embodiments, the new set of model coefficients are generated using new operating data (e.g., new variables, new values for existing variables, etc.) gathered in response to a determination that the predictive model has changed. In other embodiments, the new set of model coefficients are generated prior to the determination. For example, step 704 may include using the set of model coefficients $\hat{\beta}_2$ generated in step 606 as the new set of model coefficients (i.e., without performing another regression operation).

Still referring to FIG. 7, process 700 is shown to include determining whether the new set of model coefficients improve the fit of the predictive model relative to the existing set of model coefficients (step 708). In some embodiments, step 708 includes calculating a coefficient of variation of the root mean square error (CVRMSE) or any other metric that quantifies how well each set of model coefficients fits the equipment model. An existing CVRMSE value $CVRMSE_1$ may be calculated to represent the quality of the fit of the existing set of model coefficients and a new CVRMSE value $CVRMSE_2$ may be calculated to represent the quality of the fit of the new set of model coefficients, where lower CVRMSE indicate a better fit. Step 708 may include determining that the fit is improved when the new CVRMSE value is less than the existing CVRMSE value (e.g., $CVRMSE_2 < CVRMSE_1$).

If the new set of model coefficients improve the fit of the predictive model (i.e., the result of the determination in step 708 is "yes"), process 700 may replace the existing set of model coefficients with the new set of model coefficients in the predictive model (step 710). The updated predictive model with the new model coefficients may then be used to predict the performance of the building equipment. If the new set of model coefficients does not improve the fit of the predictive model (i.e., the result of the determination in step 708 is "no"), process 700 may retain the existing set of model coefficients in the predictive model (step 712).

Still referring to FIG. 7, process 700 is shown to include adjusting the data windows (step 714). Step 714 may be performed following step 710 or 712 as a precursor to subsequent iteration of process 700. Adjusting the data windows may include iteratively redefining the time periods $T_1$ and/or $T_2$ as time progresses. Step 714 may be substantially the same or similar to step 616 of process 600. After adjusting the data windows in step 714, process 700 may return to step 704. Process 700 may be repeated iteratively (e.g., on a periodic basis, on demand, etc.). With each iteration, steps 704-714 may be performed.

The construction and arrangement of the systems and methods as shown in the various exemplary embodiments are illustrative only. Although only a few embodiments have been described in detail in this disclosure, many modifications are possible (e.g., variations in sizes, dimensions, structures, shapes and proportions of the various elements, values of parameters, mounting arrangements, use of materials, orientations, etc.). For example, the position of elements may be reversed or otherwise varied and the nature or number of discrete elements or positions may be altered or varied. Accordingly, all such modifications are intended to be included within the scope of the present disclosure. The order or sequence of any process or method steps may be varied or re-sequenced according to alternative embodiments. Other substitutions, modifications, changes, and omissions may be made in the design, operating conditions and arrangement of the exemplary embodiments without departing from the scope of the present disclosure.

The present disclosure contemplates methods, systems and program products on memory or other machine-readable media for accomplishing various operations. The embodiments of the present disclosure may be implemented using existing computer processors, or by a special purpose computer processor for an appropriate system, incorporated for this or another purpose, or by a hardwired system. Embodiments within the scope of the present disclosure include program products or memory comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, CD-ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. Combinations of the above are also included within the scope of machine-readable media. Machine-executable instructions include, for example, instructions and data which cause a general purpose computer, special purpose computer, or special purpose processing machines to perform a certain function or group of functions.

Although the figures may show a specific order of method steps, the order of the steps may differ from what is depicted. Also two or more steps may be performed concurrently or with partial concurrence. Such variation will depend on the software and hardware systems chosen and on designer choice. All such variations are within the scope of the disclosure. Likewise, software implementations could be accomplished with standard programming techniques with rule based logic and other logic to accomplish the various connection steps, processing steps, comparison steps and decision steps.

What is claimed is:

1. A system for adaptively updating a predictive model for building equipment or a collection of building equipment, the system comprising:
building equipment that operate to affect one or more variables in a building;
an operating data aggregator module that collects a first set of operating data for the building equipment corresponding to a first time period and a second set of operating data for the building equipment corresponding to a second time period;
an autocorrelation corrector that removes an autocorrelated model error from at least one of the first set of operating data and the second set of operating data, wherein removing the autocorrelated model error comprises:
determining a residual error representing a difference between an actual output of the building equipment and an output predicted by the predictive model;
using the residual error to calculate a lag one autocorrelation for the model error; and
transforming at least one of the first set of operating data and the second set of operating data using the lag one autocorrelation;
a model generator module that generates a first set of model coefficients for the predictive model using the first set of operating data and a second set of model coefficients for the predictive model using the second set of operating data;
a test statistic module that generates a test statistic based on a difference between the first set of model coefficients and the second set of model coefficients;
a critical value module that calculates a critical value for the test statistic;

a hypothesis testing module that performs a statistical hypothesis test comprising comparing the test statistic with the critical value to determine whether the predictive model has changed;

a model update module that adaptively updates the predictive model in response to a determination that the test statistic exceeds the critical value; and a controller that uses the predictive model to control the building equipment by executing a model-based control strategy that uses the predictive model.

2. The system of claim 1, wherein adaptively updating the predictive model comprises:

generating a new set of model coefficients for the predictive model;

determining whether the new set of model coefficients improves a fit of the predictive model to a set of operating data relative to a previous set of model coefficients used in the predictive model; and replacing the previous set of model coefficients with the new set of model coefficients in the predictive model in response to a determination that the new set of model coefficients improves the fit of the predictive model.

3. The system of claim 1, wherein adaptively updating the predictive model comprises:

generating a new set of model coefficients for the predictive model;

determining whether the new set of model coefficients improves a fit of the predictive model to a set of operating data relative to a previous set of model coefficients used in the predictive model; and retaining the previous set of model coefficients in the predictive model in response to a determination that the new set of model coefficients does not improve the fit of the predictive model.

4. The system of claim 1, wherein calculating the critical value comprises:

identifying a parameter representing a predetermined likelihood that the statistical hypothesis test improperly rejects a null hypothesis that the predictive model has not changed; and using an inverse cumulative distribution function for the test statistic to determine, based on the parameter, the critical value for the test statistic such that the test statistic has the predetermined likelihood of exceeding the critical value when the predictive model has not changed.

5. The system of claim 1, wherein the model generator module:

adjusts at least one of the first time period and the second time period to define an adjusted time period based on a current time; and iteratively updates at least one of the first set of model coefficients and the second set of model coefficients using a set of the operating data corresponding to the adjusted time period.

6. The system of claim 1, further comprising a demand response module that uses the updated predictive model to generate a control output for the building equipment using a model-based control methodology.

7. A system for detecting a fault in a predictive model for building equipment or a collection of building equipment, the system comprising:

building equipment that operate to affect one or more variables in a building;

an operating data aggregator module that collects a first set of operating data for the building equipment corresponding to a first time period and a second set of operating data for the building equipment corresponding to a second time period;

an autocorrelation corrector that removes an autocorrelated model error from at least one of the first set of operating data and the second set of operating data, wherein removing the autocorrelated model error comprises:

determining a residual error representing a difference between an actual output of the building equipment and an output predicted by the predictive model;

using the residual error to calculate a lag one autocorrelation for the model error; and transforming at least one of the first set of operating data and the second set of operating data using the lag one autocorrelation;

a model generator module that generates a first set of model coefficients for the predictive model using the first set of operating data and a second set of model coefficients for the predictive model using the second set of operating data;

a test statistic module that generates a test statistic based on a difference between the first set of model coefficients and the second set of model coefficients;

a critical value module that calculates a critical value for the test statistic;

a hypothesis testing module that performs a statistical hypothesis test comprising comparing the test statistic with the critical value to determine whether the predictive model has changed;

a fault detection module that generates a fault indication in response to a determination that the test statistic exceeds the critical value; and a controller that uses the predictive model to control the building equipment by executing a model-based control strategy that uses the predictive model.

8. The system of claim 7, wherein generating the fault indication comprises:

generating a fault event indicating that the predictive model has changed; and appending to the fault event a statistical confidence that the predictive model has changed, the statistical confidence based on a parameter of the statistical hypothesis test.

9. The system of claim 7, wherein calculating the critical value comprises:

identifying a parameter representing a predetermined likelihood that the statistical hypothesis test improperly rejects a null hypothesis that the predictive model has not changed; and using an inverse cumulative distribution function for the test statistic to determine, based on the parameter, the critical value for the test statistic such that the test statistic has the predetermined likelihood of exceeding the critical value when the predictive model has not changed.

10. The system of claim 7, wherein the model generator module:

adjusts at least one of the first time period and the second time period to define an adjusted time period based on a current time; and iteratively updates at least one of the first set of model coefficients and the second set of model coefficients using a set of the operating data corresponding to the adjusted time period.

11. The system of claim 7, further comprising a demand response module that uses the updated predictive model to generate a control output for the building equipment using a model-based control methodology.

12. A method for identifying changes in a predictive model for building equipment or a system including a collection of building equipment, the method comprising:
   operating building equipment to affect one or more variables in a building;
   collecting, by an operating data aggregator module of an equipment model adaptation system, a first set of operating data for the building equipment corresponding to a first time period and a second set of operating data for the building equipment corresponding to a second time period;
   removing an autocorrelated model error from at least one of the first set of operating data and the second set of operating data, wherein removing the autocorrelated model error comprises:
      determining a residual error representing a difference between an actual output of the building equipment and an output predicted by the predictive model;
      using the residual error to calculate a lag one autocorrelation for the model error; and
      transforming at least one of the first set of operating data and the second set of operating data using the lag one autocorrelation;
   generating, by a model generator module of the equipment model adaptation system, a first set of model coefficients for the predictive model using the first set of operating data and a second set of model coefficients for the predictive model using the second set of operating data;
   generating, by a test statistic module of the equipment model adaptation system, a test statistic based on a difference between the first set of model coefficients and the second set of model coefficients;
   calculating, by a critical value module of the equipment model adaptation system, a critical value for the test statistic;
   comparing, by a hypothesis testing module of the equipment model adaptation system, the test statistic with the critical value using a statistical hypothesis test to determine whether the predictive model has changed;
   in response to the test statistic exceeding the critical value, triggering an action performed by the equipment model adaptation system, the action comprising at least one of generating a fault indication and adaptively updating the predictive model; and
   using the predictive model to control the building equipment by executing a model-based control strategy that uses the predictive model.

13. The method of claim 12, wherein the action comprises adaptively updating the predictive model, wherein adaptively updating the predictive model comprises:
   generating a new set of model coefficients for the predictive model;
   determining whether the new set of model coefficients improves a fit of the predictive model to a set of operating data relative to a previous set of model coefficients used in the predictive model;
   replacing the previous set of model coefficients with the new set of model coefficients in the predictive model in response to a determination that the new set of model coefficients improves the fit of the predictive model; and
   retaining the previous set of model coefficients in the predictive model in response to a determination that the new set of model coefficients does not improve the fit of the predictive model.

14. The method of claim 12, wherein the action comprises generating the fault indication, wherein generating the fault indication comprises:
   generating a fault event indicating that the predictive model has changed; and
   appending to the fault event a statistical confidence that the predictive model has changed, the statistical confidence based on a parameter of the statistical hypothesis test.

15. The method of claim 12, wherein the test statistic is an F-statistic based on the difference between the first set of model coefficients and the second set of model coefficients.

16. The method of claim 12, wherein calculating the critical value comprises:
   identifying a parameter representing a predetermined likelihood that the statistical hypothesis test improperly rejects a null hypothesis that the predictive model has not changed; and
   using an inverse cumulative distribution function for the test statistic to determine, based on the parameter, the critical value for the test statistic such that the test statistic has the predetermined likelihood of exceeding the critical value when the predictive model has not changed.

* * * * *